United States Patent [19]
Smith et al.

[11] Patent Number: 5,764,413
[45] Date of Patent: Jun. 9, 1998

[54] TILED RETROREFLECTIVE SHEETING

[75] Inventors: Kenneth L. Smith, White Bear Lake; Gerald M. Benson, Woodbury, both of Minn.

[73] Assignee: Minnesota Mining and Manufacturing Company, St. Paul, Minn.

[21] Appl. No.: 659,789

[22] Filed: Jun. 6, 1996

Related U.S. Application Data

[60] Provisional application No. 60/000,090, Jun. 9, 1995.
[51] Int. Cl.$^6$ ................................................ G02B 5/124
[52] U.S. Cl. ........................ 359/530; 359/529; 264/2.5
[58] Field of Search ............................ 359/529–530, 359/900; 264/1.1, 2.5, 219; 428/167–169, 172

[56] References Cited

U.S. PATENT DOCUMENTS

| | | |
|---|---|---|
| 835,648 | 11/1906 | Straubel . |
| 1,591,572 | 7/1926 | Stimson . |
| 2,027,441 | 1/1936 | Landis ........................................ 41/34 |
| 2,310,790 | 2/1943 | Jungersen . |
| 2,407,680 | 9/1946 | Palmquist et al. . |
| 3,190,178 | 6/1965 | McKenzie . |
| 3,417,959 | 12/1968 | Schultz ...................................... 249/117 |
| 3,684,348 | 8/1972 | Rowland . |
| 3,689,346 | 9/1972 | Rowland ...................................... 156/245 |
| 3,712,706 | 1/1973 | Stamm . |
| 3,810,804 | 5/1974 | Rowland ...................................... 156/245 |
| 3,811,983 | 5/1974 | Rowland ...................................... 156/245 |
| 3,812,706 | 5/1974 | Higges et al. ............................... 73/59 |
| 3,873,184 | 3/1975 | Heenan . |
| 3,922,065 | 11/1975 | Schultz . |
| 3,924,928 | 12/1975 | Trimble . |
| 3,924,929 | 12/1975 | Holmen et al. . |
| 3,926,402 | 12/1975 | Heenan ...................................... 249/117 |
| 4,025,159 | 5/1977 | McGrath . |
| 4,066,331 | 1/1978 | Lindner . |
| 4,149,304 | 4/1979 | Brynjegard ............................ 29/148.4 D |
| 4,202,600 | 5/1980 | Burke et al. . |
| 4,208,090 | 6/1980 | Heenan . |
| 4,243,618 | 1/1981 | Van Arnam ................................. 264/1 |
| 4,332,437 | 6/1982 | Searight et al. .......................... 359/531 |
| 4,349,598 | 9/1982 | White ......................................... 428/161 |
| 4,478,769 | 10/1984 | Pricone et al. ............................. 264/1.6 |
| 4,498,733 | 2/1985 | Flanagan . |
| 4,576,850 | 3/1986 | Martens ...................................... 428/156 |
| 4,582,885 | 4/1986 | Barber ........................................ 528/28 |
| 4,588,258 | 5/1986 | Hoopman . |
| 4,618,518 | 10/1986 | Pricone et al. ............................. 428/40 |
| 4,668,558 | 5/1987 | Barber ........................................ 428/156 |
| 4,703,999 | 11/1987 | Benson ...................................... 359/529 |
| 4,712,867 | 12/1987 | Malek . |
| 4,726,706 | 2/1988 | Attar .......................................... 404/14 |
| 4,775,219 | 10/1988 | Appeldorn et al. . |
| 4,801,193 | 1/1989 | Martin . |
| 4,895,428 | 1/1990 | Nelson et al. . |
| 4,938,563 | 7/1990 | Nelson et al. . |

(List continued on next page.)

FOREIGN PATENT DOCUMENTS

| | | | |
|---|---|---|---|
| 0 269 329 A2 | 6/1988 | European Pat. Off. ........ G02B 5/122 |
| 9217179 U | 4/1993 | Germany ........................ G02B 5/124 |
| 42 36 700 A1 | 5/1994 | Germany ........................ G02B 5/124 |
| 423464 | 2/1935 | United Kingdom . |
| 441319 | 1/1936 | United Kingdom . |

*Primary Examiner*—James Phan
*Attorney, Agent, or Firm*—Jed W. Caven; Robert H. Jordan; Stephen C. Jensen

[57] ABSTRACT

The present invention provides a tiled cube corner retroreflective sheeting that exhibits improved retroreflective performance in at least one plane substantially parallel with an edge of the sheeting, and preferably in two or more planes. A tiled retroreflective sheeting includes a structured surface having a plurality of cube corner element arrays oriented at a predetermined angles relative to the edge of the sheeting. The angles are selected to align at least one broad plane of entrance angularity approximately parallel with the edge of the sheeting and preferably to align another broad plane of entrance angularity approximately perpendicular to the edge of the sheeting.

11 Claims, 22 Drawing Sheets

U.S. PATENT DOCUMENTS

| | | | |
|---|---|---|---|
| 4,952,023 | 8/1990 | Bradshaw et al. | 359/529 |
| 5,122,902 | 6/1992 | Benson | 359/529 |
| 5,138,488 | 8/1992 | Szczech | 359/529 |
| 5,156,863 | 10/1992 | Pricone et al. | 425/363 |
| 5,171,624 | 12/1992 | Walter | 428/156 |
| 5,175,030 | 12/1992 | Lu et al. | 428/30 |
| 5,183,597 | 2/1993 | Lu | 264/1.4 |
| 5,237,449 | 8/1993 | Nelson et al. | 359/532 |
| 5,272,562 | 12/1993 | Coderre | 359/529 |
| 5,450,235 | 9/1995 | Smith et al. | 359/529 | ized surfaces. In particular, the present inven-
TILED RETROREFLECTIVE SHEETING

CROSS-REFERENCE TO RELATED APPLICATIONS

This application claims priority from provisional application Ser. No. 60/000,090 filed Jun. 9, 1995.

FIELD OF THE INVENTION

The present invention relates to retroreflective articles having structured surfaces. In particular, the present invention relates to retroreflective sheeting having a structured surface that includes a plurality of cube corner retroreflective elements arrays oriented at specific orientations and to molds for forming the same.

BACKGROUND

Retroreflective articles that rely upon cube corner retroreflective elements have gained wide acceptance in applications relating to traffic and personal safety marking. Cube corner retroreflective sheeting is widely used to enhance the visibility, or conspicuity, of road signs in poor lighting conditions and at night. Cube corner retroreflective sheeting has also gained wide acceptance in vehicle conspicuity marking related applications. For example, in the United States, government regulations require retroreflective materials to be positioned on semi-truck trailers to improve the conspicuity of these vehicles. Other applications for cube corner retroreflective sheeting include retroreflective sheeting for use in high-visibility clothing.

The basic cube corner retroreflective element is well known in the retroreflective arts. This element is generally a trihedral structure having three mutually substantially perpendicular lateral faces which intersect at a single reference point, or apex, and a base triangle opposite the apex. The symmetry axis, or optical axis of the element is the axis which extends through the cube apex and trisects the internal space of the cube corner element. In operation, light incident upon the base of the cube corner element is reflected from each of the three lateral faces and is redirected toward the light source. Reflection from the lateral cube corner faces may be achieved through specular reflection, in which case the lateral faces of a cube corner element are coated with a specularly reflective substance such as, for example, aluminum or silver. Alternatively, reflection may be achieved pursuant to principles of total internal reflection, in which case the faces of the cube corner element are not coated with a specularly reflective material. Retroreflective sheeting generally incorporates a structured surface including at least one array of cube corner reflective elements to enhance the visibility of an object. The total light retroreflected by the sheeting is the sum of the light retroreflected by the individual cube corner elements.

The term 'entrance angularity' is commonly used to describe the retroreflective performance of retroreflective sheeting as a function of the entrance angle of light incident on the sheeting and the orientation of the sheeting. The entrance angle of incident light is typically measured with respect to an axis that extends normal to the base surface of the sheeting. The retroreflective performance of an article may be expressed as a percentage of the total light incident on the face of the article which is returned by the article at a particular entrance angle.

Conventional truncated cube corner retroreflective elements exhibit poor entrance angularity. The amount of light retroreflected by a conventional cube-corner element drops sharply when the entrance angle of incident light deviates from the optical axis of the element. Similarly, retroreflective sheeting which employs non-canted, truncated cube corner elements exhibits poor retroreflective performance in response to light which is incident upon the sheeting at high entrance angles.

Many applications could benefit from retroreflective sheeting that exhibits broad entrance angularity in multiple planes. One such application relates to retroreflective conspicuity sheeting for the trucking industry. Truck conspicuity sheeting is typically placed on the rear and the sides of truck trailers in both a horizontal orientation and a vertical orientation relative to the frame of the trailer. To function effectively, the sheeting must retroreflect light incident on the trailer at high entrance angles when the sheeting is positioned in either orientation. Accordingly, it would be desirable to provide retroreflective truck conspicuity sheeting which exhibits broad entrance angularity in two planes. Signing applications would also benefit from retroreflective sheeting having broad entrance angularity in multiple planes. In particular, retroreflective sheeting having multiple planes of broad entrance angularity reduces the importance of positioning sheeting at a particular orientation on the sign.

One method of producing retroreflective article having broad entrance angularity in multiple planes, commonly known in the art as 'tiling', involves arranging a plurality of discrete tiles of canted cube corner arrays at different orientations on the sheeting. Examples of publications relating to tiling include Tiling has the advantage of effectively producing an article with multiple planes of broad entrance angularity. However, tiling has the inherent disadvantage that, at any given orientation, only a fraction of the tiled sections are oriented to retroreflect the maximum amount of light incident on their surface. As a result, tiled cube corner sheeting suffers an inherent loss in brightness at any given orientation to gain multiple planes of entrance angularity.

U.S. Pat. No. 4,588,258 discloses a retroreflective article which has two planes of broad entrance angularity: a first plane which is substantially coincident with the plane which includes the optical axes of the cube corner elements and a second plane which is perpendicular to the first plane. However, this article exhibits substantially broader entrance angularity in the first plane than in the second plane.

It would be desirable to provide a retroreflective sheeting that has two broad planes of entrance angularity which exhibit substantially similar retroreflective performance at non-zero entrance angles. It would be ever more desirable to provide a sheeting which could achieve this optical property without sacrificing brightness, as required by tiled cube corner sheeting. The art neither discloses nor suggests such an article or a manner of achieving such an optical property.

SUMMARY OF THE INVENTION

The present invention is directed toward a tiled cube corner retroreflective sheeting that exhibits improved entrance angularity in a plane substantially parallel with an edge of the sheeting. According to the invention, a tiled retroreflective sheeting comprises a substrate having a base surface and a structured surface displaced from the base surface. The structured surface includes at least two distinct arrays of cube corner elements. Each cube corner array is formed by three intersecting sets of substantially parallel grooves including a primary groove set and two sets of secondary grooves. The secondary groove sets intersect to define an included angle less than 60 degrees, and a major portion of substantially every groove in each primary groove set of at least one cube corner array is disposed in a plane that intersects an edge of the article at an acute angle selected from the group of angles consisting of 5 to 25 degrees, 35 to 55 degrees, and 65 to 85 degrees.

According to a preferred embodiment, the secondary groove sets intersect to define an included angle of approximately 50 degrees and a major portion of substantially every groove in each primary groove set of at least one cube corner array is disposed in a plane that intersects an edge of the article at an angle of approximately 45 degrees.

The invention further provides a method of making a mold suitable for forming a tiled retroreflective sheeting, that comprises the steps of:

(a) providing a plurality of discrete cube corner element molds, each cube corner element mold comprising a substrate having a base surface disposed in a base plane and a structured surface opposite the base surface, the structured surface including an array of cube corner elements formed by three intersecting sets of parallel grooves including a primary groove set and two sets of secondary grooves the secondary groove sets intersect at an angle less than 60 degrees; and (b) orienting a first mold such that a major portion of substantially every groove in each primary groove set of the cube corner array is disposed in a plane that intersects an edge of the article at an acute angle selected from the group of angles consisting of 5 to 25 degrees, 35 to 55 degrees, and 65 to 85 degrees.

BRIEF DESCRIPTION OF THE DRAWINGS

FIGS. 1, 2, 7–9, 11, 13, and 14 are not drawn to scale.

DETAILED DESCRIPTION

The present invention provides cube corner retroreflective articles that exhibit improved optical performance characteristics. One embodiment of the present invention is directed toward providing a retroreflective sheeting that exhibits improved entrance angularity in at least one plane. While not necessary, it is preferred that an article in accordance with the present invention has at least two planes of "broad entrance angularity". It is even more preferred that an article in accordance with the present invention returns substantially the same amount of light at a given entrance angle in either plane of broad entrance angularity.

One aspect of the present invention lies in the recognition that certain assumptions implicit in prior cube corner technology do not hold true for all cube corner geometries. In particular, one important assumption implicit in prior cube corner technology is that canting the optical axes of cube corner elements through a given angle in a particular plane improves the entrance angularity of the article in a plane that is substantially parallel to the plane that contains the optical axes of the cube corner elements and perpendicular to the base plane of the sheeting. We have found that this assumption is not accurate for all classes of cube corner geometries. A second aspect of the present invention lies in the recognition that the optical performance of retroreflective articles that have planes of broad entrance angularity that are not coincident with the plane in which the optical axes of cube corner elements lie may be improved by aligning the planes of broad entrance angularity at a particular orientation angle relative to an edge of the sheeting. Preferably, the broad planes of entrance angularity should be oriented approximately parallel with one of the edges of the sheeting.

Figure 1:
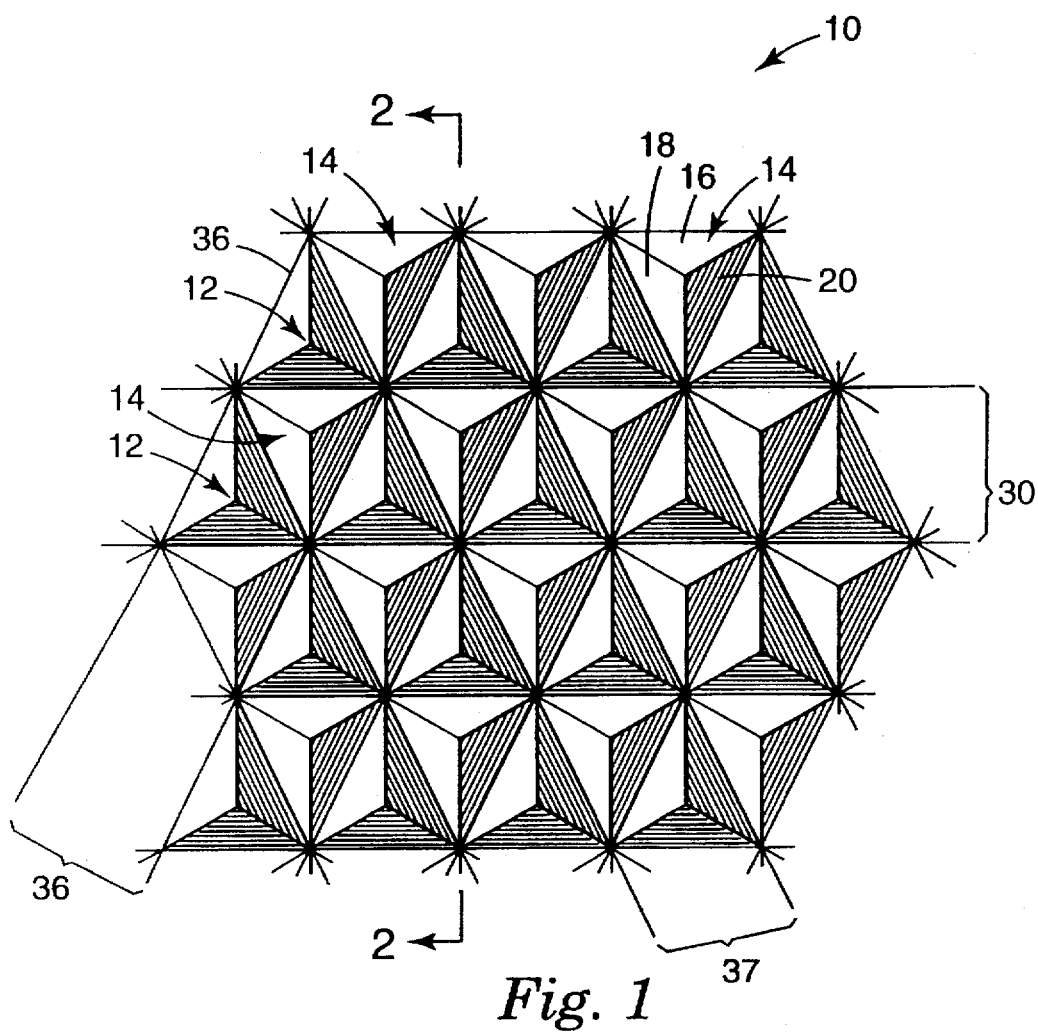
FIG. 1 is a magnified plan view of a portion of one embodiment of a cube corner article in accordance with principles of the present invention.

FIG. 1 is a magnified schematic plan view of a portion of a structured surface 10 of an article that includes a plurality of cube corner elements 12, 14 formed by three mutually intersecting groove sets including a primary groove set 30 and two sets of secondary grooves 36, 37. Cube corner elements 12, 14 have three approximately mutually perpendicular faces 16, 18, 20 and a base triangle bounded by one groove in each of the three groove sets in the substrate. The distance between adjacent grooves in each groove set preferably measures between less than about 600 microns and more preferably measures about 150–200 microns, however it should be appreciated that the precise measurements of the cube corner elements are not critical. The included angles of the base triangles of the cube corner elements 12, 14 depicted in FIG. 1 measure approximately 65 degrees, 65 degrees, and 50 degrees, however, the particular geometry of the base triangle of cube corner elements 12, 14 is not critical and it will be appreciated that the present invention is not limited to cube corner elements having these specific base triangle measurements.

The designation of groove set 30 as a primary groove set and groove sets 36, 37 as secondary groove sets is essentially an arbitrary convention. For cube corner elements that have isosceles base triangles, such as the cube corner elements depicted in FIG. 1, the secondary groove sets 36, 37 have substantially identical groove angles (e.g. 38.721°). By contrast, the groove side angle $a_1$ of the primary groove 30 (e.g. 27.795°) differs from the groove side angle of secondary groove sets 36, 37. By adopting the convention of designating one groove set as a primary groove set, the orientation of a cube corner array relative to the edge of the substrate upon which the array is disposed can be defined by the angle at which the primary groove set 30 intersects the edge of the substrate.

Figure 2:
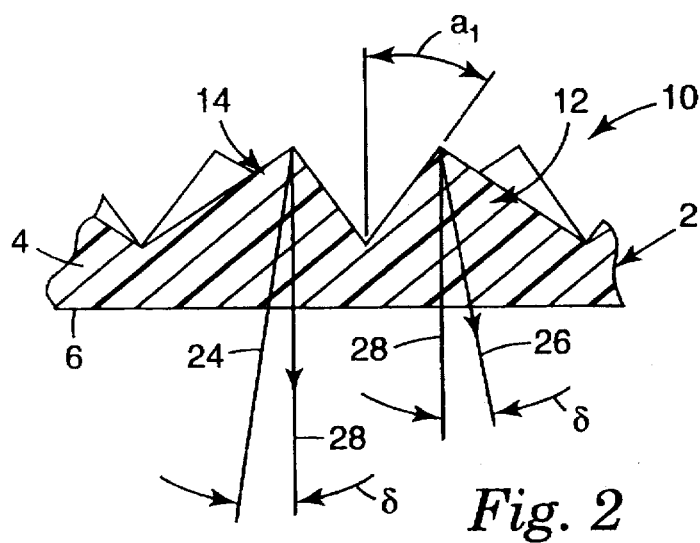
FIG. 2 is a cross-sectional view of the cube corner article depicted in FIG. 1.

FIG. 2 is a cross-sectional view of a portion of an article 2 having a structured surface 10 as depicted in FIG. 1. Article 2 includes a substrate 4 which, when laid flat, has a base surface 6 disposed in a base plane and a structured surface 10 displaced from base surface 6. The material from which substrate 4 is formed may vary depending upon the particular application for which article 2 is suited. Suitable materials for different applications are discussed below. Additionally, in the embodiment illustrated in FIG. 2, structured surface 10 is opposite from, and substantially co-planar with, base surface 6, however, it will be appreciated that structured surface 10 need neither be directly opposite from, nor co-planar with, base surface 6.

Referring to FIG. 2, the symmetry axes 24, 26 of cube corner elements 12, 14 are canted through a cant angle, δ, of approximately 7.47 degrees from an axis 28 that extends substantially normal to base surface 6 and intersects the apex of the respective cube corner elements 12, 14. It will be appreciated, however, that the precise cant angle, δ, is not critical and the present invention contemplates a range of cant angles extending from about 4 degrees to about 15 degrees. In the embodiment illustrated in FIG. 2, cube corner elements 12, 14 are canted in a plane that is approximately perpendicular to primary groove 30. More precisely, cube corner elements 12, 14 are canted such that the symmetry axes 24, 26 lie in a plane that is approximately perpendicular to primary groove 30 and to base surface 6. Canted cube corner elements such as those depicted in FIGS. 1–2 may be referred to as 'backward' canted cube corner elements. Backward canted cube corner elements may be further characterized in that only one included angle of the cube corner element base triangle measures less than 60 degrees; the other two included angles measure at least 60 degrees and, in the embodiment illustrated, measure about 65 degrees. By contrast, forward canted cubes may be characterized in that two of the included angles of the base triangle measure less than 60 degrees and a single base triangle included angle measures greater than 60 degrees.

FIG. 2 also shows that the groove side angle $a_1$ of primary groove 30 measures approximately 29.795 degrees. Although not shown in FIG. 2, the groove side angle of secondary grooves 36, 37 measure approximately 38.721 degrees. Retroreflective sheeting incorporating cube corner elements substantially as depicted in FIGS. 1 and 2 is disclosed in U.S. Pat. No. 2,310,790 (Jungersen).

Figure 3:
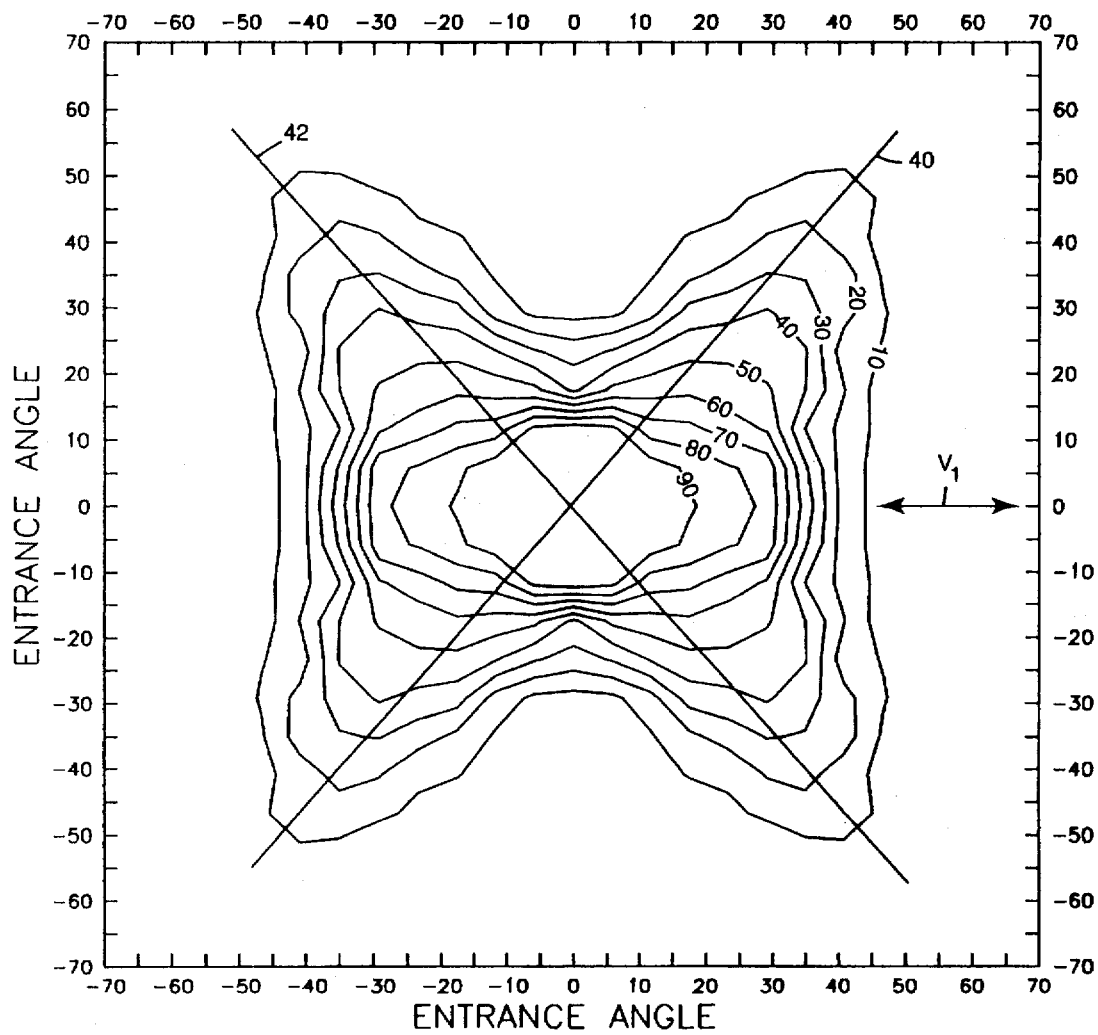
FIG. 3 is a graph of isobrightness curves depicting the predicted retroreflective performance of a retroreflective article in accordance with the article depicted in FIG. 1.

FIG. 3 is an isobrightness contour graph illustrating the predicted total light return for a retroreflective cube corner element matched pair formed by backward canted cube corner elements 12, 14 formed from a material having an index of refraction of 1.517 at varying entrance angles and orientation angles. Predicted total light return for a cube corner matched pair array may be calculated from a knowledge of percent active area and ray intensity. Total light return is defined as the product of percent active area and ray intensity. An excellent discussion of total light return for directly machined cube corner arrays is presented by Stamm U.S. Pat. No. 3,812,706.

For an initial unitary light ray intensity, losses may result from two pass transmission through the base surface of the sheeting and from reflection losses at each of the three cube surfaces. Base surface transmission losses for near normal incidence and a sheeting refractive index of about 1.5 are roughly 0.92. Reflection losses for cubes which have been reflectively coated depend for example on the type of coating and the angle of incidence relative to the cube surface normal. Typical reflection coefficients for aluminum reflectively coated cube surfaces are roughly 0.85 to 0.9 at each of the cube surfaces. Reflection losses for cubes which rely on total internal reflection are essentially zero. However, if the angle of incidence of a light ray relative to the cube surface normal is less than the critical angle, then total internal reflection can break down and a significant amount of light may pass through the cube surface. Critical angle is a function of the refractive index of the cube material and of the index of the material behind the cube (typically air). Standard optics texts such as Hecht, "Optics", 2nd edition, Addison Wesley, 1987 explain front surface transmission losses and total internal reflection.

Effective area for a single or individual cube corner element may be determined by, and is equal to, the topological intersection of the projection of the three cube corner surfaces on a plane normal to the refracted incident ray with the projection of the image surfaces of the third reflection on the same plane. One procedure for determining effective aperture is discussed for example by Eckhardt, Applied Optics, v. 10 n. 7, July 1971, pg. 1559–1566. Straubel U.S. Pat. No. 835,648 also discusses the concept of effective area or aperture. Percent active area for a single cube corner element is then defined as the effective area divided by the total area of the projection of the cube corner surfaces. Percent active area may be calculated using optical modeling techniques known to those of ordinary skill in the optical arts or may be determined numerically using conventional ray tracing techniques. Percent active area for a cube corner matched pair array may be calculated by averaging the percent active area of the two individual cube corner elements in the matched pair. Alternatively stated, percent active aperture equals the area of a cube corner array which is retroreflecting light divided by the total area of the array. Percent active area is affected for example by cube geometry, refractive index, angle of incidence, and sheeting orientation.

Referring to FIG. 3 vector $V_1$ represents the plane that includes the symmetry axes 24, 26 of cube corner elements 12, 14. For example, in FIG. 1, vector $V_1$ lies in a plane substantially perpendicular to primary groove 30. The concentric isobrightness curves represent the predicted total light return as a percentage of peak total light return of the array of cube corner elements 12, 14 at various combinations of entrance angles and orientation angles. Radial movement from the center of the plot represents increasing entrance angles, while circumferential movement represents changing the orientation of the cube corner element with respect to the light source. The innermost isobrightness curve demarcates the set of entrance angles at which a matched pair of cube corner elements 12, 14 return approximately 90% of peak total light return. Successively outlying isobrightness curves demarcate entrance angles which return successively lower percentages of the peak total light return of elements 12, 14.

Figure 4:
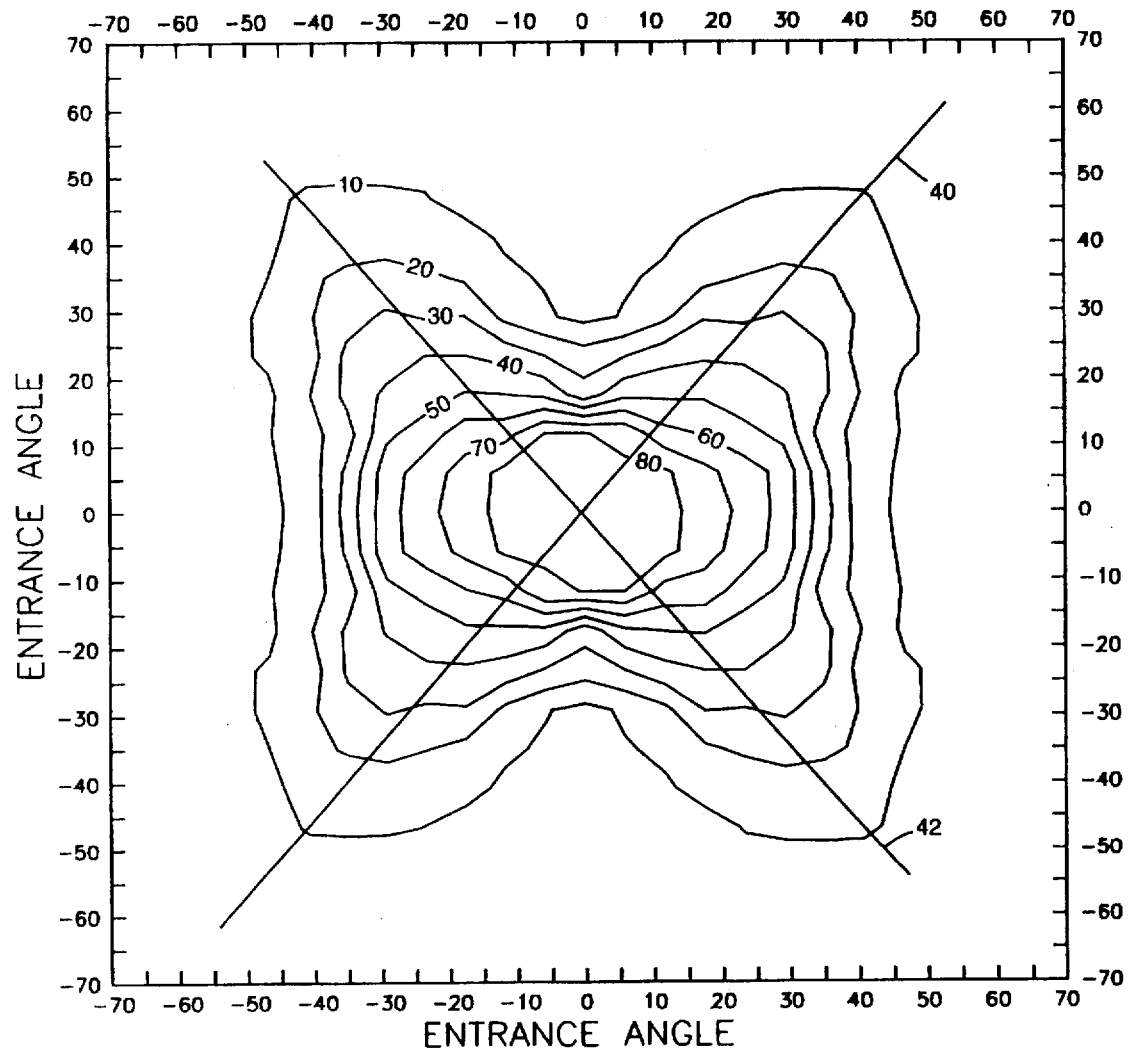
FIG. 4 is a graph of isobrightness curves depicting the measured retroreflective performance of a retroreflective article in accordance with the article depicted in FIG. 1.

FIG. 4 is an isobrightness graph, similar to the graph presented in FIG. 3, that illustrates the measured total light return of a cube corner element matched pair having the same geometry as the cube corner element matched pair depicted in FIGS. 1 and 2. The cube corner elements are formed from BK7 glass, which has a refractive index of 1.517. Although slight variations in the plots exist due to manufacturing imperfections, measurement errors, and the refractive index of the chosen material, the measured results illustrated in FIG. 4 confirm the shape of the isobrightness profile depicted in FIG. 3.

Two aspects of the isobrightness plots illustrated in FIGS. 3–4 should be noted. First, the plots demonstrate that a matched pair of cube corner elements 12, 14 has two planes of broad entrance angularity that are substantially perpendicular to one another and that lie in a plane that is not coincident with the plane in which the cube corner elements are canted, indicated by vector $V_1$. For the cube corner matched pair depicted in FIGS. 1-2, the two broad planes of entrance angularity are oriented at approximately 45 degrees relative to the plane in which the cube corner elements are canted and may be identified on the isobrightness graphs as two substantially perpendicular planes 40, 42 which are coincident with the broad lobes of the isobrightness graph.

Figure 5:
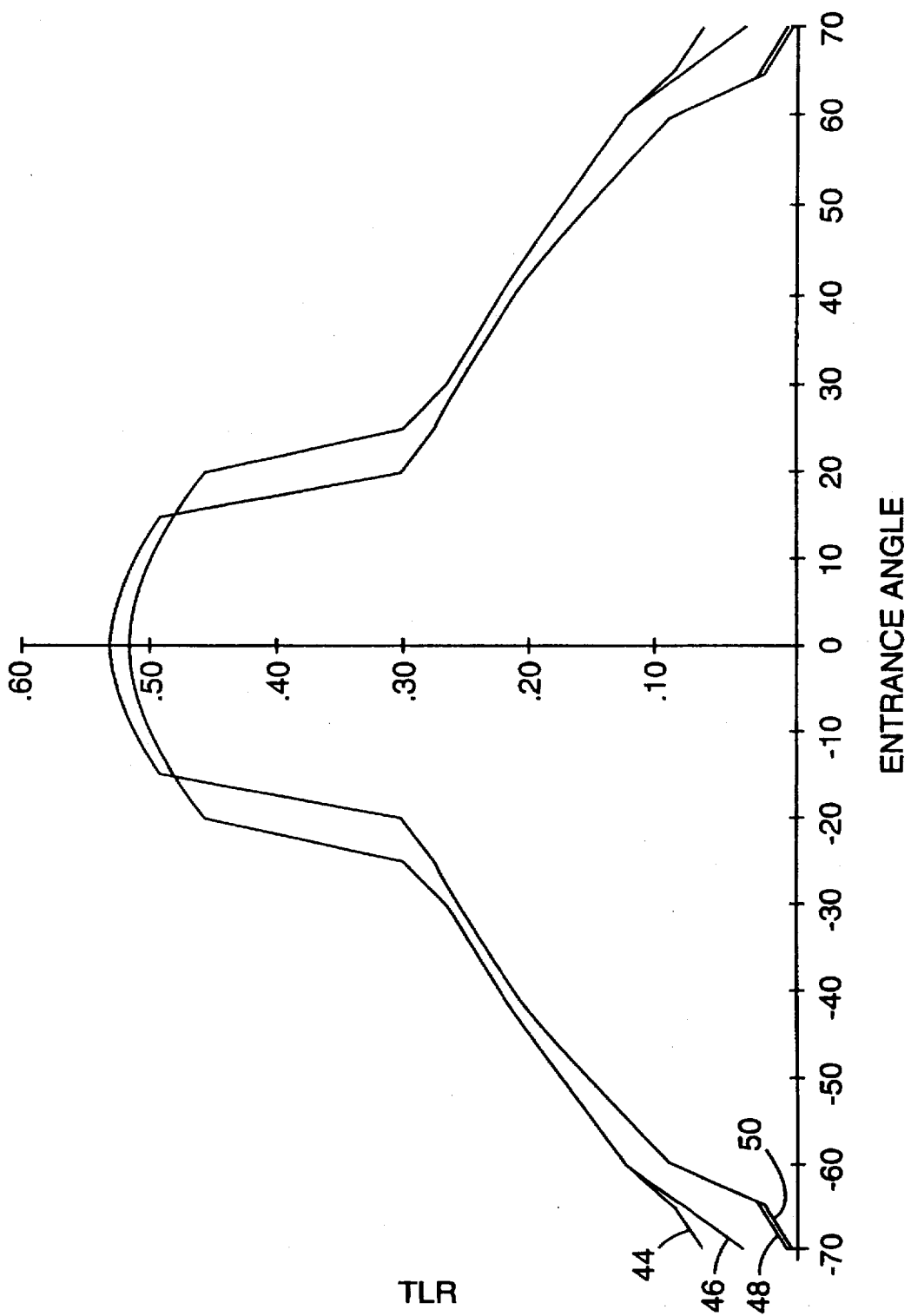
FIG. 5 is a graph of the total light return as a function of the entrance angle of incident light for the cube corner geometry depicted in FIGS. 1–2.

A second aspect of the isobrightness curves depicted in FIGS. 3–4 results from the fact that cubes 12, 14 are substantially symmetrical about plane $V_1$. Accordingly, a matched pair of cube corner elements having the geometry depicted in FIGS. 1-2 will return approximately the same percentage of light at a given entrance angle in either plane 40 or plane 42. This aspect is illustrated in greater detail in FIG. 5, which plots the predicted total light return of cube corner elements 12, 14 as a function of the entrance angle of light incident on the base of elements 12, 14 in planes corresponding to planes 40 and 42. Curves 44 and 46 represent the total light return of a retroreflective cube corner element matched pair formed from a material having an index of refraction of 1.6 The two curves are virtually superimposed across the entire range of entrance angles, indicating that the total light reflected by the matched pair is approximately equal at a given entrance angle in planes corresponding to either plane 40 or plane 42. The slight differences above 60° result from numerical errors in predicting performance for cubes at very high entrance angles. Curves 48 and 50 are analogous curves for a retroreflective cube corner element matched pair formed from a material having an index of refraction of 1.5.

Figure 6:
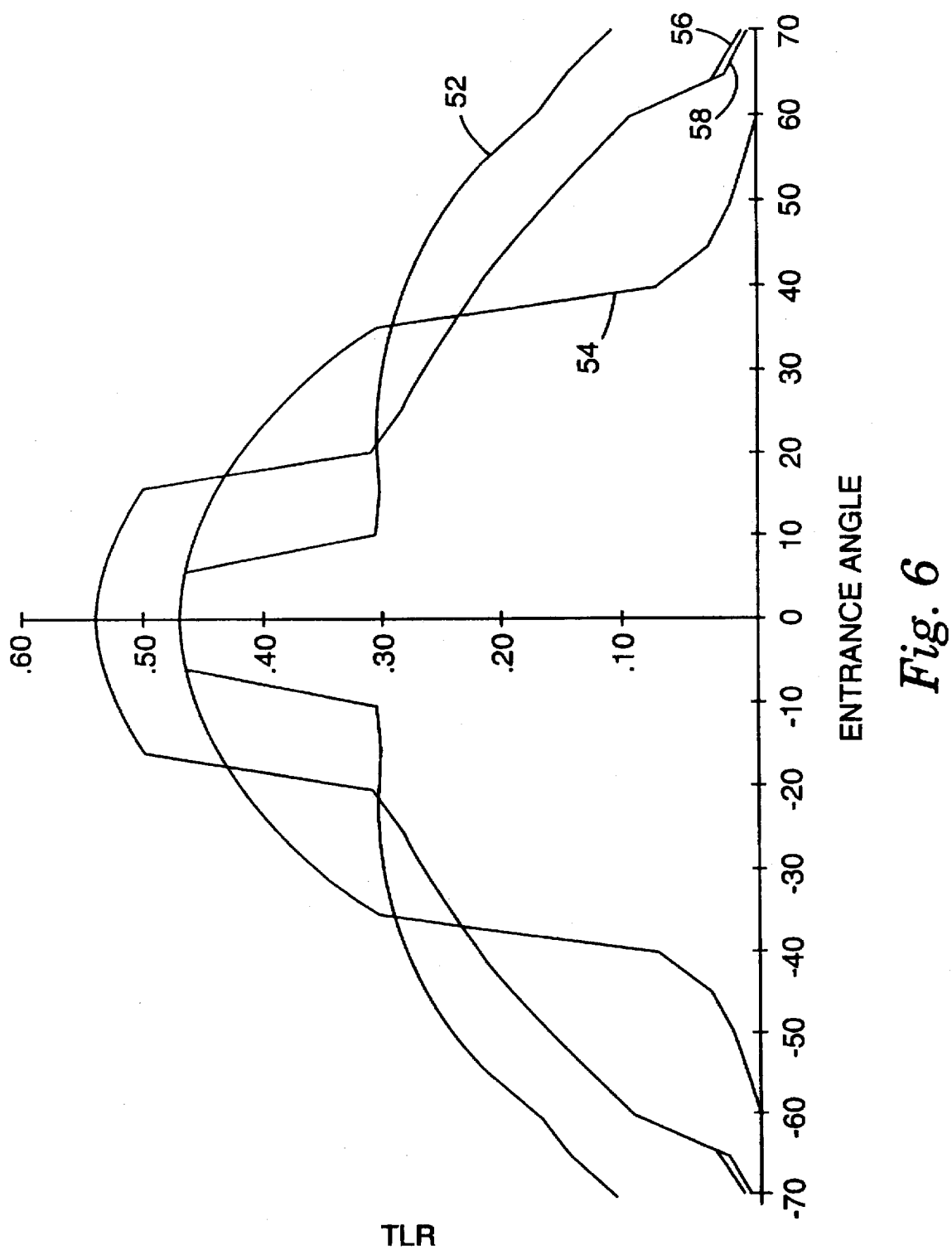
FIG. 6 is a graph comparing the total light return as a function of the entrance angle of incident light for the cube corner geometry depicted in FIGS. 1–2 with a different cube corner geometry.

FIG. 6 compares the retroreflective performance of the cube corner element matched pair geometry depicted in FIGS. 1-2 with the forward canted cube corner element matched pair geometry depicted in U.S. Pat. No. 4,588,258 (the '258 patent) having a refractive index of 1.5. Curve 52 plots the total light return as a function of entrance angle in the broadest plane of entrance angularity in the '258 patent geometry. This plane is identified as the 'X' plane in the '258 patent. Curve 54 plots the total light return as a function of entrance angle in the second broadest plane of entrance angularity in 258 geometry. This plane is identified as the 'Y' plane in the '258 patent. Curves 56 and 58 plot the total light return as a function of entrance angle for the two broad planes of entrance angularity for the geometry depicted in FIG. 1. FIG. 6 demonstrates that, at entrance angles of greater than about 35–40 degrees, the cube corner element matched pair as depicted in FIG. 1 returns a greater percentage of light in both planes of broad entrance angularity 40, 42 than the geometry depicted in the '258 patent returns in the 'Y' plane.

Figure 7:
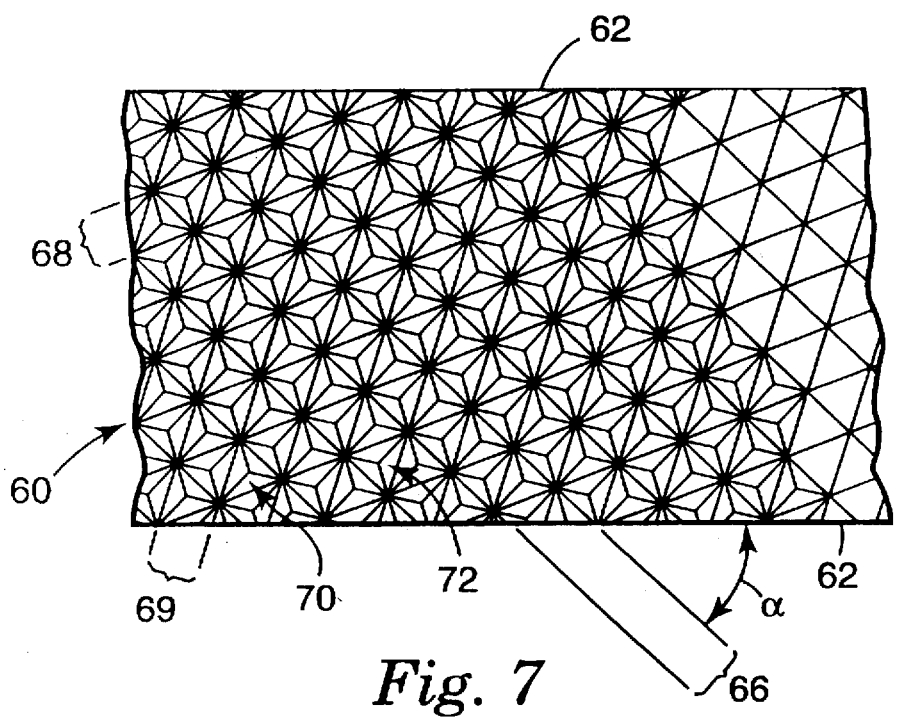
FIG. 7 is a schematic view of one embodiment of cube corner retroreflective sheeting in accordance with principles of the present invention.

FIG. 7 is a schematic plan view of a representative retroreflective sheeting 60 that has two broad planes of entrance angularity in accordance with principles of the present invention. Sheeting 60 includes first and second longitudinal edges 62 and a structured surface substantially as described in connection with the structured surface depicted in FIGS. 1–2. The structured surface includes an array of cube corner element matched pairs defined by three intersecting sets of substantially parallel grooves including a primary groove 66 and two sets of secondary grooves 68, 69. Because the cube corner elements have isosceles base triangles, two of the base included angles are the same. The primary groove set may be defined as the groove set joining the two equal angles of the base triangle. The remaining groove sets may be considered secondary groove sets. In the embodiment depicted in FIG. 7, the array extends substantially entirely across the surface of the sheeting. Each matched pair of cube corner elements includes two opposing individual cube corner elements 70, 72 canted in a plane substantially perpendicular to primary groove 66. Additionally, a major portion of substantially every primary groove 66, and preferably the entire primary groove 66, lies in a plane that intersects a longitudinal edge 62 of the article at an angle, $\alpha$, that preferably measures approximately 45 degrees. It should be noted that the structured surface is greatly magnified in FIG. 7 for illustrative purposes. In practice, the distance between adjacent grooves typically measures between about 60 and 600 microns.

Although opposing çube corner elements 70, 72 of each matched pair depicted in FIG. 7 are physically located directly opposite primary groove 66 from one another, it will be appreciated that such relative physical location is not a requirement of the present invention. In its broadest sense, the term 'opposing', as used herein may be construed to mean optically opposing. Cube corner elements may be considered optically opposing when they generate 'mirror image' retroreflection patterns. It is well known in the cube corner retroreflective arts that cube corner elements which are physical mirror images of one another—that is, elements which are substantially identical but are rotated 180 degrees relative to one another, yield mirror image retroreflective patterns. Direct machining techniques make it advantageous to position opposing cube corner elements directly opposite a groove from one another, as depicted in FIG. 7. However, it will be appreciated that opposing cube corner elements could be physically remote from one another one the sheeting. Additionally, it will be appreciated that opposing cube corner elements need not be perfect physical mirror images of one another to yield optically opposing cube corner elements. Slight variations in the physical shape of opposing cube corner elements will yield only slight variations in the retroreflective pattern which are not detectable by the human eye under normal viewing conditions. Such cube corner elements are still opposing elements within the meaning of the term used as used herein.

A retroreflective sheeting having a structured surface as depicted in FIG. 7 exhibits a theoretical isobrightness profile substantially the same shape as that depicted in FIG. 3. However, because the array of cube corner elements is oriented such that the primary grooves 66 lie in a plane which intersects the edge of the sheeting at an angle of approximately 45 degrees, one broad plane of entrance angularity, corresponding with plane 40 of FIG. 3, is approximately parallel with the longitudinal edges 62 of sheeting 60. The other broad plane of entrance angularity, corresponding with plane 42 of FIG. 3, is approximately perpendicular to the longitudinal edges of sheeting 60. One of ordinary skill in the art will recognize that the retroreflective performance of sheeting 60 may vary from the theoretical performance depicted in FIG. 3 as a result of factors such as manufacturing imperfections and measurement errors. Such minor variations are considered within the scope of the present invention.

Figure 8:
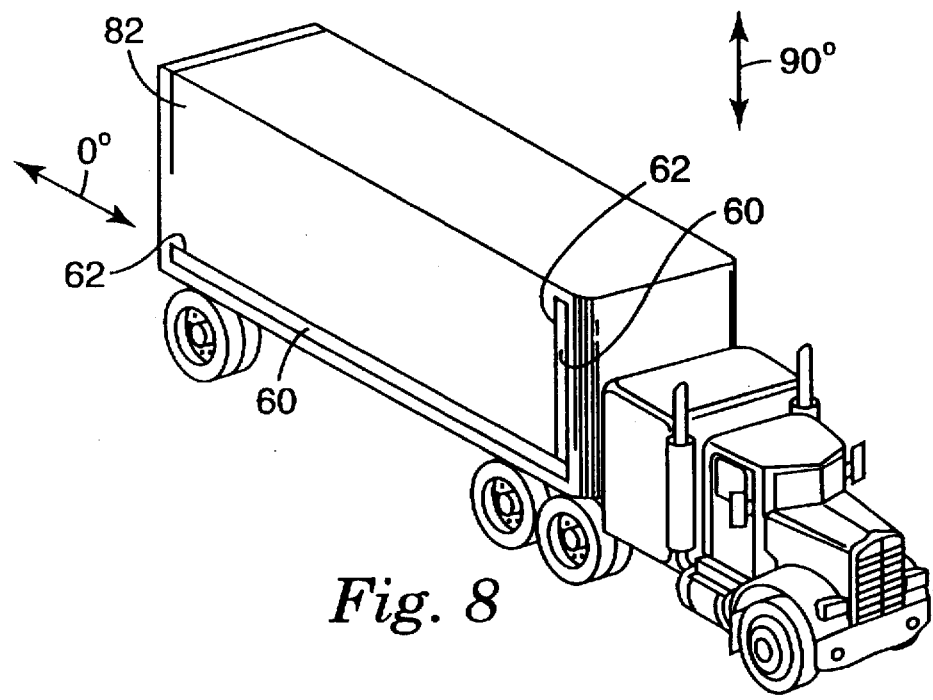
FIG. 8 is a perspective view of a motor vehicle illustrating one application of the sheeting depicted in FIG. 7 as truck conspicuity sheeting.

One application in which retroreflective sheeting 60 is particularly advantageous is in the field of vehicle conspicuity sheeting. FIG. 8 is a schematic depiction of a large vehicle 82 having a strip of retroreflective sheeting 60 disposed in a horizontal orientation and a strip of retroreflective sheeting 60 disposed in a vertical orientation Retroreflective sheeting 60 retroreflects light from the headlights of passing automobiles to enhance the conspicuity of vehicle 82. To maximize the amount of light returned by horizontally oriented strip of retroreflective sheeting 60 at high entrance angles, its broadest plane of entrance angularity should be substantially parallel with its longitudinal edge 62. By contrast, to maximize the amount of light returned by vertically oriented strip of retroreflective sheeting 60 at high entrance angles, its broadest plane of entrance angularity should be substantially perpendicular to its longitudinal edge 62.

Retroreflective sheeting 60 is particularly well suited for such vehicle conspicuity applications. When sheeting 60 is placed on vehicle 82 in the horizontal orientation, one broad plane of entrance angularity is aligned substantially parallel (e.g. within approximately 5°) with the longitudinal edge 62 of retroreflective sheeting 60, thereby maximizing the amount of light returned by horizontal strip at high entrance angles. Similarly, when sheeting 60 is placed on the vehicle in the vertical orientation, one broad plane of entrance angularity is aligned substantially perpendicular to the longitudinal edge 62 of retroreflective sheeting 60, thereby maximizing the amount of light returned by vertical strip at high entrance angles. The ability to supply a single sheeting product for this application yields savings in the design, manufacturing, distribution, and installation processes for such conspicuity sheeting.

Sheeting 60 is similarly advantageous in the highway sign sheeting applications. As discussed above, the retroreflective performance of most canted cube-corner sheeting products is dependent upon the orientation of the sheeting on the sign. For example, sheeting illustrated in the '258 patent has better entrance angularity in the plane identified as the X-plane. To ensure the best optical performance from the sheeting of the '258 patent, the sheeting must be oriented such that the X-plane is coincident with the entrance plane of incident light. By contrast, the sheeting depicted in FIG. 7 may be oriented such that either plane of broad entrance angularity is coincident with the entrance plane of incident light.

For most applications, sheeting 60 exhibits its best retroreflective performance when one plane of broadest entrance angularity is aligned substantially parallel with the longitudinal edge 62 of sheeting. For the cube corner geometry depicted in FIG. 7, this corresponds to a structured surface in which the major portion of the primary grooves 66, and preferably the entire length of each primary groove 66, lies in a plane that intersects a longitudinal edge 62 of the sheeting at an angle measuring 45 degrees. However, it will be appreciated by one of ordinary skill in the art that the primary grooves need not lie in planes which intersect the edge of a piece of sheeting at exactly 45 degrees. Although the retroreflective brightness of the article will decrease as the angle at which primary groove 66 intersects the edge 62 of the article deviates from 45 degrees, the decrease will be gradual. Depending upon the performance requirements, the advantages of the present invention may be obtained with the geometry depicted in FIG. 7 provided primary groove 66 intersects the edge 62 at an angle that measures between about 35 and 55 degrees and more preferably between about 40 and 50 degrees. Additionally, numerous other cube corner geometries exist that have planes of broad entrance angularity angularly displaced from the plane in which the optical axis of the cube corner element is canted. One of ordinary skill in the retroreflective arts will appreciate that the performance of retroreflective sheeting incorporating such cube corner elements may be improved by oriented the cube corner elements such that the broad planes of entrance angularity are aligned substantially parallel with an edge of the sheeting.

The optical advantages of the present invention may be achieved using cube corner element geometries other than the geometry depicted in FIG. 1. A broad class of cube corner elements that have scalene base triangles have isobrightness profiles that are suitable for manufacturing retroreflective sheeting in accordance with aspects of the present invention. Scalene base triangle cube corner elements may be characterized in that none of the three included angles of the cube corner element base triangle are the same.

Figure 9:
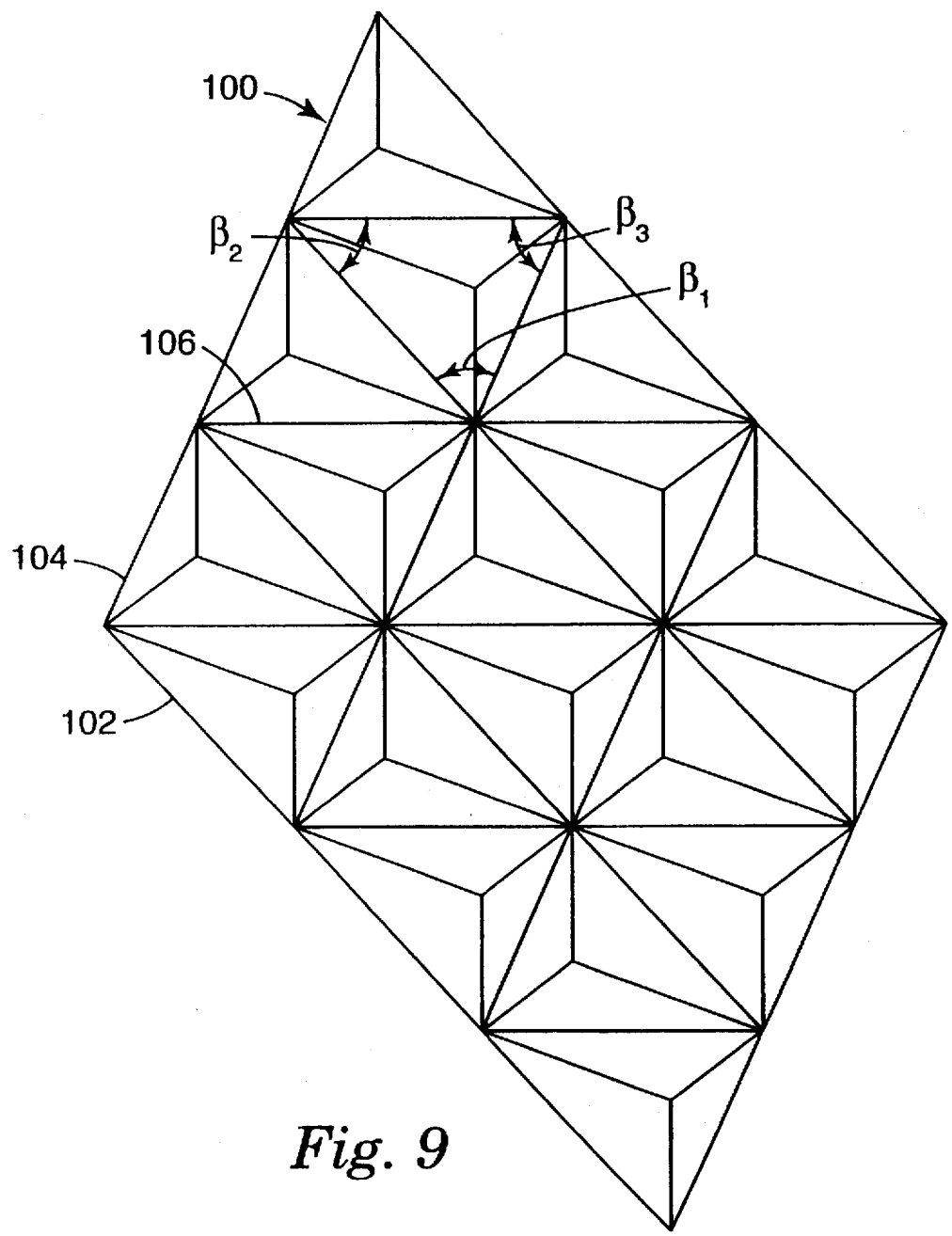
FIG. 9 is a perspective view of a retroreflective sheeting which employs scalene base triangle cube corner elements.

One example of structured surface 100 employing a representative scalene base triangle cube corner element geometry is depicted in FIG. 9. The included angles of the base triangle of each cube corner retroreflective element measure approximately 62.09 degrees, 50.00 degrees, and 67.91 degrees ($\beta_1$, $\beta_2$, and $\beta_3$, respectively). The groove side angle of groove 102 ($a_3$) measures approximately 41.812 degrees; the groove side angle of groove 104 ($a_2$) measures approximately 27.623 degrees; and the groove side angle of groove 106 ($a_1$) measures approximately 35.702 degrees. The optical axis of each cube corner element is canted approximately 8.30 degrees from an axis normal to the base surface of the substrate in a plane that is approximately parallel to groove 106 and perpendicular to the base surface of the material.

Figure 10:
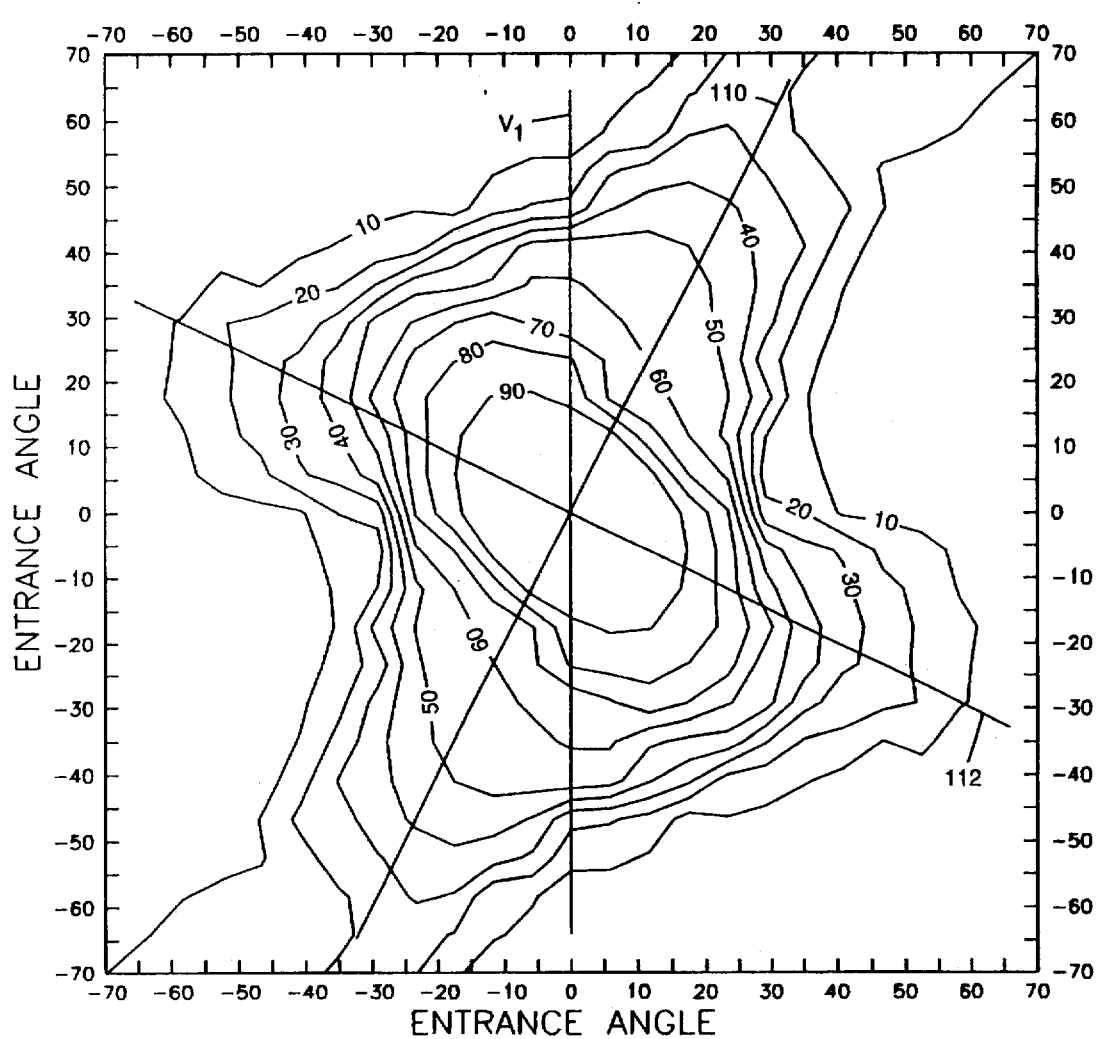
FIG. 10 is a graph of isobrightness curves depicting the predicted retroreflective performance of a retroreflective article in accordance with the article depicted in FIG. 9.

FIG. 10 is a predicted isobrightness profile of a retroreflective sheeting employing cube corner element matched pairs formed from a material having a refractive index of 1.590 and having the geometry depicted in FIG. 9. Vector $V_1$ corresponds to the plane in which the cube corner elements are canted (i.e. the plane that contains the symmetry axes of the cube corner elements) The cube corner geometry depicted in FIG. 9 exhibits two planes of broad entrance angularity, denoted by planes 110, 112, that are angularly displaced from the plane in which the cube corner elements are canted by approximately 30 degrees and 120 degrees, respectively. Additionally, planes 110 and 112 are approximately perpendicular to one another. Accordingly, orienting the structured surface such that groove 106 intersects a longitudinal edge of a retroreflective sheeting at either 30 degrees or 60 degrees will align one broad planes of entrance angularity parallel with the longitudinal edge of the sheeting and another broad plane of entrance angularity perpendicular to the longitudinal edge of the sheeting.

Figure 11:
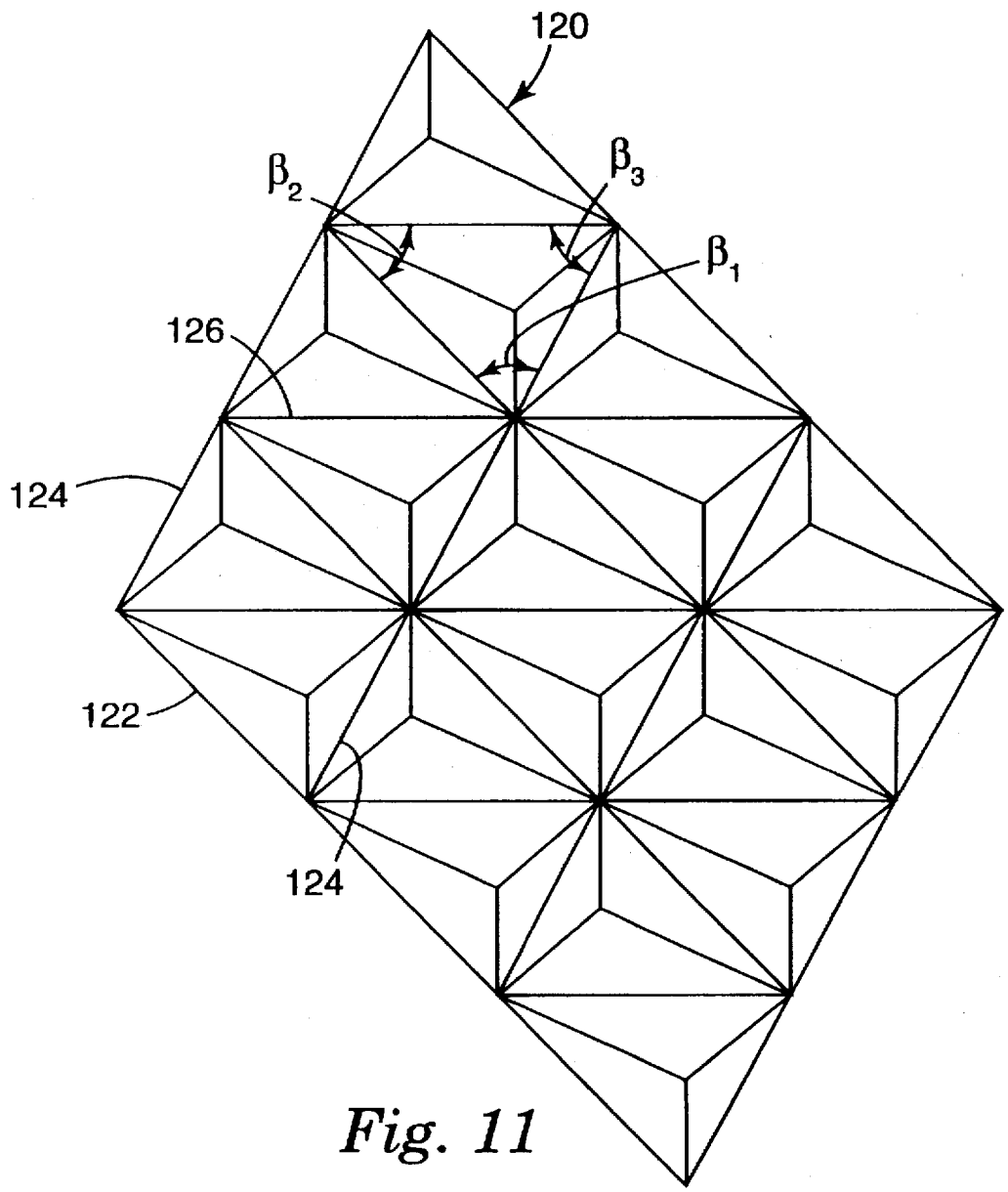
FIG. 11 is a perspective view of a retroreflective sheeting which employs scalene base triangle cube corner elements.

FIG. 11 illustrates a structured surface 120 including another scalene base triangle cube corner geometry that has two broad planes of entrance angularity angularly displaced from the plane in which opposing cube corner elements are canted. The included angles of the cube corner element base triangles depicted in FIG. 11 measure approximately 68.71 degrees, 48.00 degrees, and 63.29 degrees ($\beta_1$, $\beta_2$, and $\beta_3$, respectively). The groove side angle of groove 122 ($a_3$) measures approximately 36.324 degrees; the groove side angle of groove 124 ($a_2$) measures approximately 26.283 degrees; and the groove side angle of groove 126 ($a_1$) measures approximately 42.306 degrees. The optical axes of the cube corner elements are canted approximately 9.51 degrees from an axis normal to the base surface of the substrate in a plane that intersects groove 126 at an angle of approximately 45 degrees.

Figure 12:
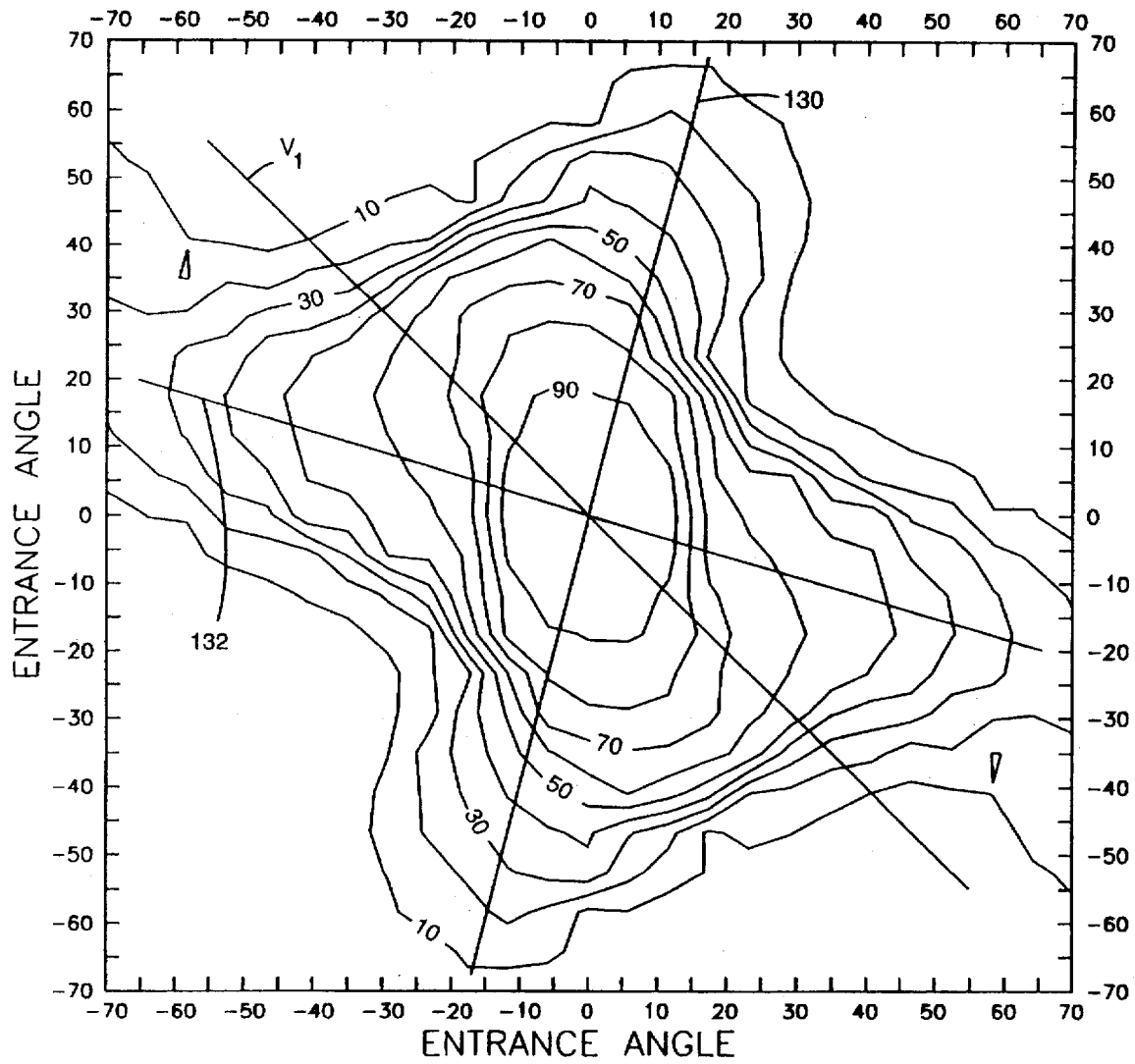
FIG. 12 is a graph of isobrightness curves depicting the predicted retroreflective performance of a retroreflective article in accordance with the article depicted in FIG. 11.

As illustrated in FIG. 12, a retroreflective sheeting that includes an array of cube corner elements as depicted in FIG. 11 and having a refractive index of 1.590 has two broad planes of entrance angularity 130, 132 angularly displaced from the plane in which the elements are canted $V_1$ by about 26 degrees and 116 degrees, respectively. Accordingly, orienting the structured surface such that groove 126 intersects a longitudinal edge of a retroreflective sheeting at either 19 degrees or 71 degrees will align one broad planes of entrance angularity parallel with the longitudinal edge of the sheeting and another broad plane of entrance angularity perpendicular to the longitudinal edge of the sheeting.

Cube corner element designs employing scalene base triangles have some additional advantages over cube corner elements having isosceles base triangles. One advantage is that a structured surface having scalene base triangle cube corner elements may allow a greater degree of canting of opposing cube corner elements in the manufacturing process without causing physical damage to adjacent cube corner elements.

In directly machined cubes using three sets of mutually intersecting grooves, cube clipping occurs when any one of the groove side angles exceeds 45°, causing the cutting tool to clip the edge of an adjacent cube. A damaged cube corner element results in losses in retroreflectivity. For example, the cube corner element geometry depicted in U.S. Pat. No. 4,588,258 cannot be canted beyond a cant angle of 9.736 degrees in a conventional array. In Table I, below, representative scalene geometry values for base triangle included angles ($\beta$) and groove side (a) angles, are shown for canting opposing cube corner elements in a plane which is roughly parallel to a groove and perpendicular to the base plane. Scalene geometries may permit greater amounts of tilt prior to any groove side angle exceeding 45 degrees, thereby allowing tilting of cube corner elements beyond the known limitations due to mechanical clipping caused by a cutting tool. For example, Table I demonstrates that a tilt or cant angle of up to roughly 13.376 degrees can be utilized without edge clipping.

TABLE I

| $\beta_2$ | $\beta_3$ | $\beta_1$ | $a_1$ | $a_2$ | $a_3$ | Tilt Angle |
|---|---|---|---|---|---|---|
| 40.0 | 73.321 | 66.679 | 36.695 | 21.063 | 45.789 | 14.912 |
| 41.0 | 72.845 | 66.155 | 36.577 | 21.677 | 45.485 | 14.305 |
| 42.0 | 72.358 | 65.642 | 36.464 | 22.300 | 45.161 | 13.689 |
| 42.5 | 72.110 | 65.390 | 36.408 | 22.614 | 44.992 | 13.376 |
| 43.0 | 71.858 | 65.142 | 36.354 | 22.931 | 44.818 | 13.061 |
| 44.0 | 71.345 | 64.655 | 36.247 | 23.571 | 44.455 | 12.421 |
| 45.0 | 70.817 | 64.183 | 36.145 | 24.221 | 44.071 | 11.769 |
| 46.0 | 70.274 | 63.727 | 36.047 | 24.881 | 43.666 | 11.105 |
| 47.0 | 69.713 | 63.287 | 35.953 | 25.550 | 43.238 | 10.426 |
| 48.0 | 69.133 | 62.867 | 35.864 | 26.230 | 42.787 | 9.733 |
| 49.0 | 68.533 | 62.467 | 35.780 | 26.921 | 42.313 | 9.025 |
| 50.0 | 67.912 | 62.088 | 35.700 | 27.623 | 41.814 | 8.300 |
| 51.0 | 67.266 | 61.734 | 35.626 | 28.336 | 41.289 | 7.559 |
| 52.0 | 66.595 | 61.405 | 35.558 | 29.061 | 40.738 | 6.801 |
| 53.0 | 65.896 | 61.104 | 35.495 | 29.797 | 40.160 | 6.024 |
| 54.0 | 65.167 | 60.833 | 35.440 | 30.545 | 39.553 | 5.228 |
| 55.0 | 64.405 | 60.595 | 35.391 | 31.304 | 38.917 | 4.412 |
| 56.0 | 63.607 | 60.393 | 35.349 | 32.075 | 38.250 | 3.574 |
| 57.0 | 62.770 | 60.230 | 35.316 | 32.857 | 37.552 | 2.715 |
| 58.0 | 61.892 | 60.109 | 35.291 | 33.650 | 36.822 | 1.833 |

TABLE I-continued

| $\beta_2$ | $\beta_3$ | $\beta_1$ | $a_1$ | $a_2$ | $a_3$ | Tilt Angle |
|---|---|---|---|---|---|---|
| 59.0 | 60.967 | 60.033 | 35.275 | 34.452 | 36.058 | 0.927 |
| 60.0 | 60.000 | 60.000 | 35.264 | 35.264 | 35.264 | 0.000 |

In combination with the teachings of this invention relating to improved preferred entrance angularity not in the plane of cant, scalene base geometry cube corner element arrays also enable tilting beyond previously known limits at which total light return breaks down for light incident perpendicular or normal to the base of the cubes. Total light return (TLR) for retroreflective sheeting is derived from the product of percent active aperture and retroreflected light ray intensity. For some combinations of cube geometries, entrance angles, and refractive index, significant reductions in ray intensity may result in relatively poor total light return even though percent active aperture is relatively high. One example is retroreflective cube corner element arrays which rely on total internal reflection of the retroreflected light rays. Ray intensity is substantially reduced if the critical angle for total internal reflection is exceeded at one of the cube faces. Although metallized or other reflective coatings may be utilized advantageously in such situations, these coatings are not always desirable due to cost, process, appearance, or other factors. In such situations, the use of scalene base triangle cube corner elements is preferred.

Table II shows limiting total light return geometries for normally incident light and cubes with a refractive index of 1.586. For a 52.2°–52.2°–74.6° base angle cube corner element the limiting tilt angle is 15.60°, for example as shown in U.S. Pat. No. 4,588,258 (Hoopman). However, this limitation may be exceeded without total light return breakdown using scalene base geometries, for example, 16.410 (45.40°–58.57°–76.03°) or even 18.830° (77.358°–65.642°–37.00°). Data in Table II represent numerical rather than analytical solutions.

TABLE II

| $\beta_1$ | $\beta_2$ | $\beta_3$ | $a_1$ | $a_2$ | $a_3$ | Tilt |
|---|---|---|---|---|---|---|
| 75.600 | 52.200 | 52.200 | 50.867 | 26.505 | 26.505 | 15.602 |
| 75.749 | 48.900 | 55.351 | 50.939 | 24.769 | 28.080 | 15.857 |
| 76.030 | 45.400 | 58.570 | 50.924 | 22.949 | 29.689 | 16.408 |
| 76.623 | 41.400 | 61.977 | 50.985 | 20.840 | 31.290 | 17.476 |
| 77.358 | 37.000 | 65.642 | 50.816 | 18.582 | 33.064 | 18.830 |

Principles of the present invention may also be applied to tiled retroreflective sheeting. As used herein, a tiled structured surface includes a plurality of discrete arrays of cube corner element matched pairs positioned at different orientations relative to the edge of the sheeting. Tiling is one strategy employed to produce retroreflective sheeting having multiple planes of broad entrance angularity. Tiled retroreflective sheeting suffers some inherent loss of brightness at high entrance angles because, by definition, only a portion of the arrays are oriented to retroreflect the maximum amount of light at a given entrance angle and sheeting orientation. However, it is possible to minimize, or at least to reduce, the brightness loss inherent in tiled sheeting by orienting the arrays of cube corner elements on the structured surface in accordance with principles of the present invention.

The utility of tiling may be explained with reference to the retroreflective sheeting depicted in FIG. 7. As discussed above, the structured surface of the retroreflective sheeting depicted in FIG. 7 has a single array of cube corner element matched pairs which results in two broad planes of entrance angularity: a first plane substantially parallel with a longitudinal edge 62 of sheeting 60 and a second plane substantially perpendicular to longitudinal edge 62 of sheeting 60. A tiled retroreflective sheeting including a structured surface having two distinct arrays positioned at two different orientations relative to the edge of the sheeting may have as many as four broad planes of entrance angularity. Similarly, a retroreflective sheeting including a tiled structured surface having three distinct tiled arrays positioned at three different orientations relative to the edge of the sheeting may have as many as six broad planes of entrance angularity. In general, for the cube corner geometry depicted in FIG. 7, a retroreflective sheeting having a number X broad planes of entrance angularity may be produced by a structured surface having a plurality of tiled arrays positioned at X/2 distinct orientations relative to the edge of the sheeting.

In accordance with the present invention, at least one of the arrays of cube corner element matched pairs should be oriented such that one broad plane of entrance angularity is positioned approximately parallel with the edge of the sheeting. Accordingly, for the cube corner element geometry depicted in FIG. 7, one array of cube corner element matched pairs should be oriented at such that the primary groove intersects the edge of the article at an angle of approximately 45 degrees.

The orientation of the remaining arrays depends upon the number of discrete arrays of cube corner element matched pairs in the structured surface. For the cube corner geometry of FIG. 7, assuming that the goal of tiling is to produce a more rotationally symmetrical retroreflection pattern, the angular difference $\epsilon$ between arrays of cube corner element matched pairs may be expressed by the formula:

$$\epsilon = 90/N$$

where N represents the number of discrete arrays of cube corner elements. Thus, in a retroreflective sheeting having four broad planes of entrance angularity (e.g. using N=2 arrays of cube corner elements) the angular difference $\epsilon$ in the orientation of the cube corner arrays should measure approximately 45 degrees. Accordingly, the second array of cube corner elements should be oriented such that the primary groove intersects the edge of the article at an angle of approximately 90 degrees. Similarly, in a retroreflective sheeting having six broad planes of entrance angularity the difference $\epsilon$ in the orientation of the cube corner arrays should measure approximately 30 degrees. Accordingly, a second array of cube corner elements should be oriented such that the primary groove intersects the edge of the article at an angle of approximately 15 degrees relative to a longitudinal edge of the sheeting and a third array of cube corner elements should be oriented such that the primary groove intersects the edge of the article at an angle of approximately 75 degrees relative to a longitudinal edge of the sheeting. This progression may be continued through as many distinct orientations as desired.

Figure 13:
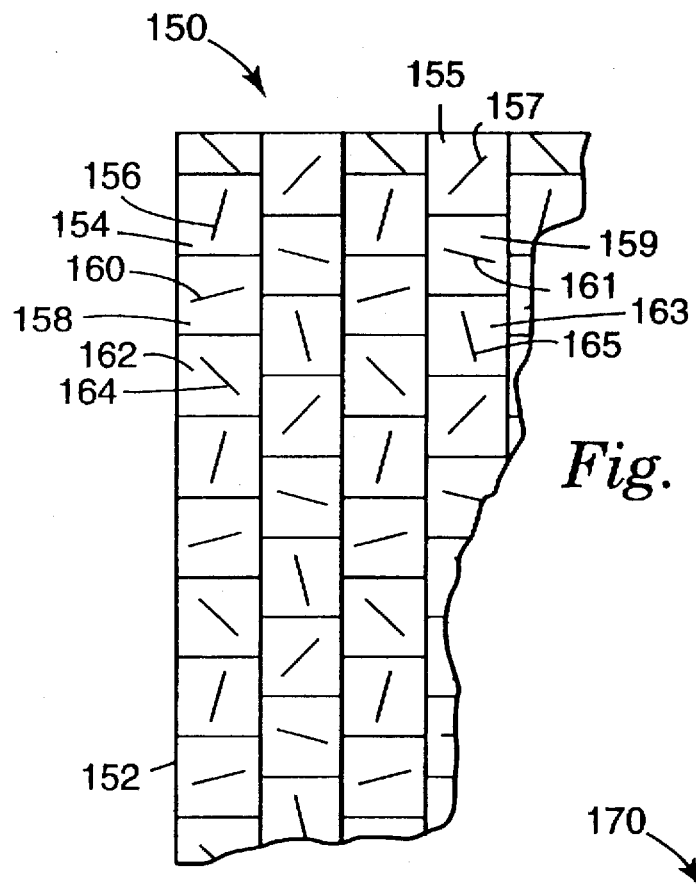
FIG. 13 is a schematic plan view of a cube corner retroreflective sheeting in accordance with principles of the present invention.

FIG. 13 is a schematic depiction of one embodiment of a tiled retroreflective sheeting 150 in accordance with the present invention which has six arrays of cube corner elements resulting in six planes of broad entrance angularity. In a preferred embodiment, retroreflective sheeting 150 is manufactured as a continuous web of thin, flexible retroreflective sheeting capable of being wound onto a roll. The structured surface of retroreflective sheeting 150 includes six groups of cube corner element matched pair arrays positioned at six distinct orientations relative to a longitudinal edge 152 of sheeting 150: a first group of arrays 154 positioned such that the primary groove intersects the edge 152 at an acute angle of 15 degrees, a second group of arrays 158 positioned such that the primary groove intersects the edge 152 at an acute angle of 75 degrees, and a third group of arrays 162 positioned such that the primary groove intersects the edge 152 at an acute angle of 45 degrees, a fourth group of arrays 155 positioned such that the primary groove intersects the edge 152 at an acute angle of 45 degrees, a fifth group of arrays 159 positioned such that the primary groove intersects the edge 152 at an acute angle of 75 degrees and a sixth group of arrays 163 oriented such that the primary groove intersects the edge 152 at an acute angle of 15 degrees. Each of the arrays is formed from cube corner element matched pairs substantially identical to those described in connection with FIGS. 1 and 2, above. Vectors 156, 160, and 164 represent the direction of the primary grooves of each array 154, 158, 162, respectively, of cube corner elements. Similarly, vectors 157, 161, and 165 represent the direction of the primary groove of arrays 155, 159, and 163, respectively. Although not necessary, it is preferred that each of the six distinct groups of arrays 154, 155, 158, 159, 162 and 163 cover approximately one-sixth of the surface area of structured surface of sheeting 150.

Sheeting 150 has six broad planes of entrance angularity. Two broad planes of entrance angularity, corresponding to the group of arrays 162 and 155 are aligned at approximately 0 degrees and 90 degrees relative to longitudinal edge 152 of sheeting 150. Two broad planes of entrance angularity, corresponding to the set of arrays 154 and 159 are aligned at approximately 60 degrees and 150 degrees relative to an edge of sheeting 150. Two broad planes of entrance angularity, corresponding to the set of arrays 158 and 163 are aligned at approximately 30 and 120 degrees relative to an edge of sheeting 150.

The sheeting 150 depicted in FIG. 13 employs six arrays oriented at six distinct orientations to produce a retroreflective sheeting with six broad planes of entrance angularity, one of which is aligned substantially parallel with a longitudinal edge 152 of sheeting 150. However, it will be appreciated that sheeting 150 could incorporate a greater or lesser number of arrays to produce a retroreflective sheeting with a correspondingly greater or lesser number of broad planes of entrance angularity.

As discussed above in connection with single-array embodiments of the present invention, the arrays need not be precisely aligned to achieve the advantages of the invention. For many applications positioning the cube corner arrays within about five degrees of the preferred orientation will be sufficient to produce the required brightness at a given entrance angle.

Figure 14:
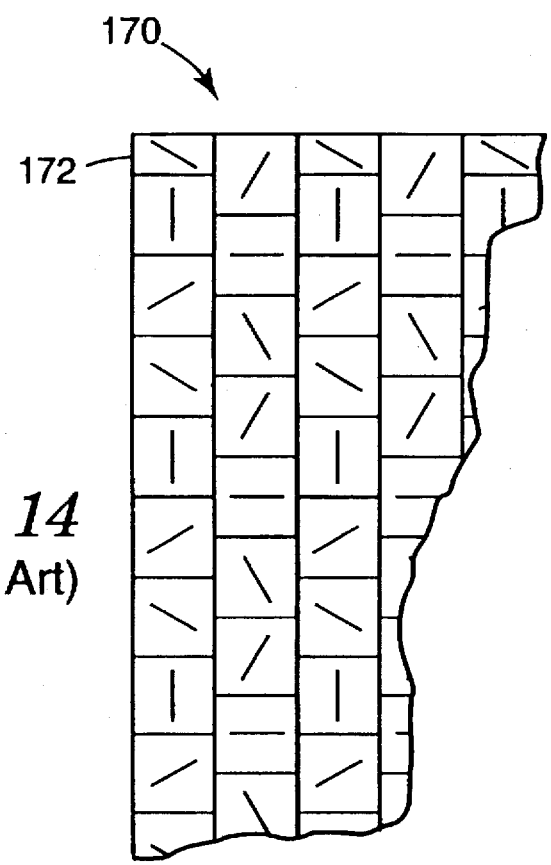
FIG. 14 is a schematic plan view of a commercially available cube corner retroreflective sheeting.

FIG. 14 is a schematic representation of retroreflective sheeting 170 which employs a plurality of tiled arrays of backward canted cube corner element matched pairs similar to those depicted in FIGS. 1–2. The sheeting depicted in FIG. 14 is commercially available from Stimsonite Corporation of Niles, Ill. and is manufactured and distributed under the trade name STIMSONITE High Performance Grade Reflective Sheeting (Lot 1203W, Product Number 8432170). The structured surface of retroreflective sheeting 170 includes a plurality of groups of cube corner element matched pair arrays positioned at a plurality of distinct orientations relative to a longitudinal edge 172 of sheeting 170. The cube corner arrays are oriented such that the primary grooves of the arrays lie in planes that are positioned at orientations of 0 degrees, 30 degrees, 60 degrees, and 90 degrees relative to longitudinal edge 172 of sheet 170.

Figure 15:
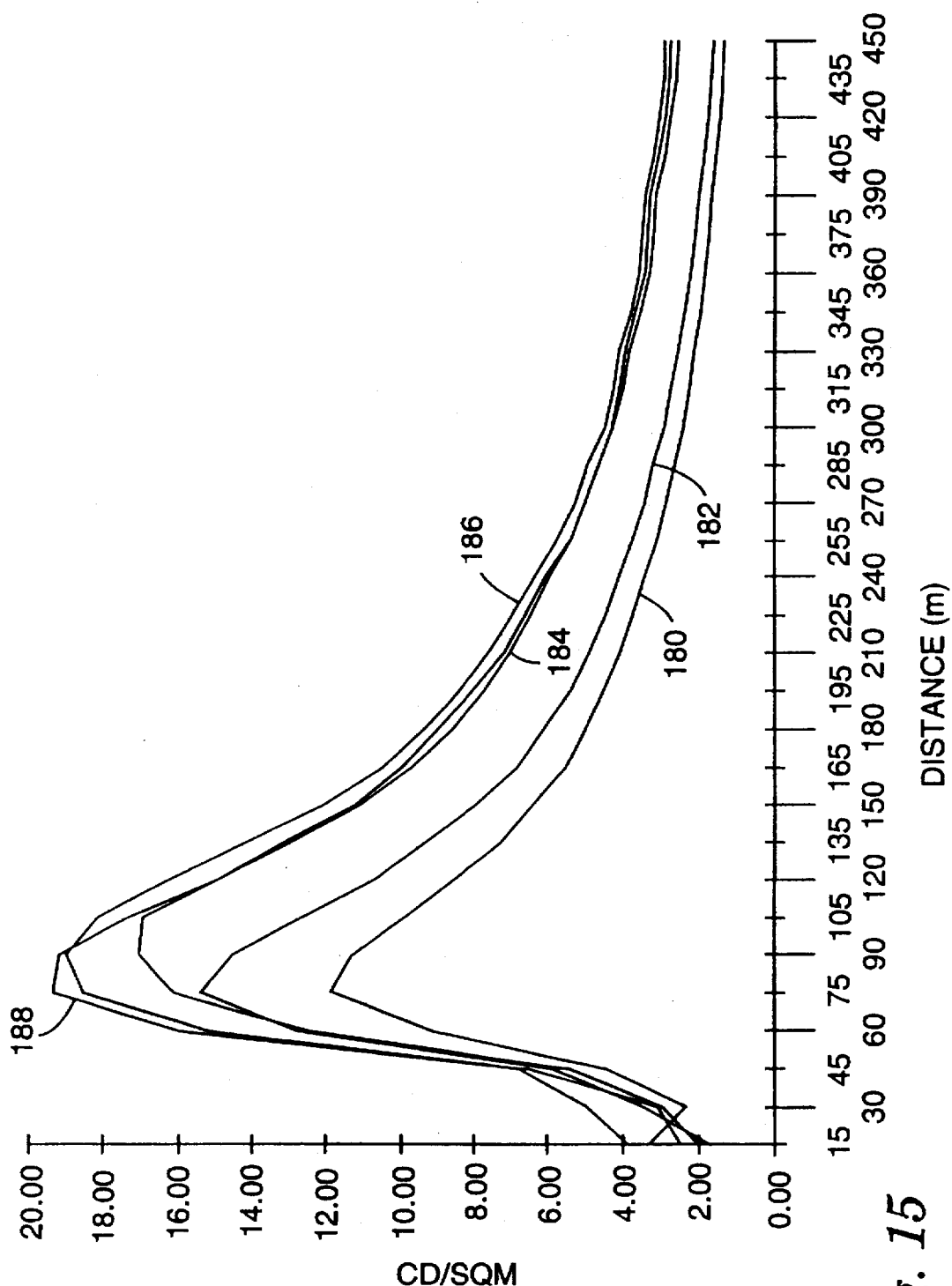
FIG. 15 is a graph comparing the optical performance of the sheeting illustrated in FIG. 13 with the sheeting illustrated in FIG. 14.

Positioning the tiled sections of retroreflective sheeting to align the broad planes of entrance angularity at angles of approximately 0 degrees and 90 degrees relative to a longitudinal edge 152 of sheeting 150 in accordance with the present invention achieves significant performance gains over the tiled sheeting depicted in FIG. 14. These performance gains are illustrated in FIG. 15, which depicts the luminance (in candelas per square meter) of retroreflective sheeting as a function of the distance (in meters) for varying orientations of tiles sections on retroreflective sheeting (e.g. varying groove alignment angles). The luminance data in FIG. 15 is representative of a standard sedan approaching a semi-truck trailer which is parked at a 45 degree angle across the road. The retroreflective sheeting is positioned horizontally across the bottom edge of the semi-trailer. A detailed description of the testing environment and methodology employed to generate FIG. 15 may be found in Sign Luminance as a Methodology for Matching Driver Needs, Roadway Variables, and Signing Materials, by Woltman and Szczech, Transportation Research Record, 1213, Human performance and Highway Visibility—Design Safety and Methods, Transportation Research Board, National Research Council, pp. 21–26, (1989).

In FIG. 15, curve 180 corresponds to the sheeting of FIG. 14. Curve 182 corresponds to sheeting having cube corner arrays positioned at orientations of 5, 35, and 65 degrees, curve 184 corresponds to sheeting having cube corner arrays positioned at orientations of 10, 40, and 70 degrees, curve 186 corresponds to sheeting having cube corner arrays positioned at orientations of 15, 45, and 75 degrees, and curve 188 corresponds to sheeting having cube corner arrays positioned at orientations of 20, 50, and 80 degrees. FIG. 15 demonstrates that sheeting having cube corner arrays positioned at orientations of approximately 15, 45 and 75 degrees exhibits the best retroreflective performance at almost all distances from the sheeting. Similarly, sheeting having cube corner arrays positioned at orientations of 10, 40, and 70 degrees and sheeting having cube corner arrays positioned at 20, 50, and 80degree orientations exhibit good retroreflective performance across the range of distances modeled. A 0 degree orientation, corresponding to sheeting 170, exhibited the poorest retroreflective performance. Tiled retroreflective sheeting oriented in accordance with the present invention outperforms the sheeting depicted in FIG. 14 at all distances depicted on the curve. Additionally, sheeting in accordance with the present invention is nearly twice as bright in the critical range of distances extending from about 50 meters to about 150 meters.

Reflective sheeting in accordance with the present invention may be made as one integral material, e.g., by embossing a preformed sheet with a described array of cube-corner elements, or by casting a fluid material into a mold. Alternatively, such retroreflective sheeting may be made as a layered product, e.g, by casting the elements against a preformed film as taught in U.S. Pat. No. 3,684,348, or by laminating a preformed film over the front face of individual molded elements.

Useful tools for manufacturing retroreflective sheeting in accordance with the present invention include embossing molds which may be in the form of continuous belts or mandrills. Such continuous molds may be formed using a replication process which begins with the direct machining of a structured surface in a machinable substrate using a precision machining tool such as, for example, a diamond ruling or turning machine to produce a master mold or article. The structured surface may replicated by electrolytic deposition of nickel onto a master article. A plurality of such replicated tools may be connected into an embossing or casting mold. To the extent that the present invention describes articles having novel structured surface geometries, the claims of the present invention are intended to cover replicas, tooling and molds used in the manufacturing process of retroreflective sheeting.

Suitable materials for retroreflective articles or sheeting of this invention are preferably transparent materials which are dimensionally stable, durable, weatherable, and easily replicated into the desired configuration. Illustrative examples of suitable materials include glass; acrylics, which have an index of refraction of about 1.5, such as PLEXIGLAS brand resin manufactured by Rohm and Haas Company; polycarbonates, which have an index of refraction of about 1.59; reactive materials such as taught in United Kingdom Patent No. 2,027,441 and U.S. Pat. Nos. 4,576,850, 4,582, 885, and 4,668,558; materials transparent to the wavelengths of actinic radiation used in curing cube corner elements formed of the material(s); polymeric material selected from the group consisting of poly(carbonate), poly (methylmethacrylate), poly(ethyleneterephthalate), and crosslinked polymers of multi-functional acrylate monomers; polyethylene based ionomers, such as those marketed under the brand name of SURLYN by E. I. Dupont de Nemours and Co., Inc.; polyesters, polyurethanes; and cellulose acetate butyrates. Polycarbonates are particularly suitable because of their toughness and relatively high refractive index, which generally contributes to improved retroreflective performance over a wider range of entrance angles. These materials may also include dyes, colorants, pigments, UV stabilizers, or other additives. Colorants may include fluorescent dyes or pigments to improve daytime visibility and conspicuity of the sheeting. Transparency of the materials ensures that the separation or truncated surfaces will transmit light through those portions of the article or sheeting.

The incorporation of truncated or separation surfaces does not eliminate the retroreflectivity of the article, but rather it renders the entire article partially transparent. In some applications requiring partially transparent materials, low indices of refraction of the article will improve the range of light transmitted through the article. In these applications, the increased transmission range of acrylics (refractive index of about 1.5) is desirable.

In fully retroreflective articles, materials having high indices of refraction are preferred. In these applications, materials such as polycarbonates, with refractive indices of about 1.59, are used to increase the difference between the indices of the material and air, thus increasing retroreflection. Polycarbonates are also generally preferred for their temperature stability and impact resistance.

The invention also contemplates use of a cast and cure type of manufacturing process using the cube corner element optical designs disclosed about to create a sheeting having superior optical performance and excellent flexibility. One embodiment of an article using this process comprises a first polymeric composition for the cube corner elements and a second polymeric overlay materials which is a thermoplastic material. Preferably, the overlay material is transparent to the wavelengths of actinic radiation used in curing the resin forming the cube corner elements. Another preferred characteristic of the materials of this embodiment is the relative elastic modulus for each component. High elastic modulus materials are preferable for the cube corner elements due to their mechanical properties that impart distortion resistance. The overlay material is preferably a polymeric material of somewhat lower relative elastic modulus. During curing of the cube corner component, depending on the composition of the cube corner material, the individual cube corner elements can experience a certain degree of shrinking. If the elastic modulus of the overlay material is too high, torsional stresses can be applied to the cube corner elements as they shrink during curing. If the stresses are sufficiently high, then the cube corner elements can become distorted with a resulting degradation in optical performance. When the elastic modulus of the overlay film is sufficiently lower than the modulus of the cube corner materials, the overlay can deform along with the shrinking of the cube corner element without exerting the type of deformational stresses on the cube corner element to which it is adhered that would lead to a degradation of optical characteristics.

Alternatively, the differential between the elastic modulus of the cube corner element and the overlay material need not be as great depending on the dimensions of the cube corner elements. When the cube corner elements are of lower height, the differential between the elastic modulus of the cube corner element and the overlay film need not be as great, presumably because the smaller cube corner elements do not undergo as great a shrinkage during curing, as measured in absolute dimensional units, and the overlay film does not interact with the cube corner elements toward the creation of torsional and dimensional stresses to as great an extent as with the larger cube corner elements. In general, it is possible to state that the modulus differential between the overlay material and the cube corner element material should be on the order of 1.0 to $1.5 \times 10^7$ pascals, or more. As the height of the cube corner elements diminishes, it is possible for this modulus differential to reach the low end of the range given immediately above. However, it should be kept in mind that there is a practical lower limit to the modulus of the cube corner element material. Below a certain level, generally on the order of about 2.0 to $2.5 \times 10^8$ pascals, the cube corner elements become too flexible and do not possess sufficient mechanical rigidity to properly fracture upon application of a stress. Fracturing is a feature which is desirable in some embodiments to achieve discrete cube corner elements. Without such fracturing, the de-coupling of the individual cube corner elements that is essential to the flexibility and the superior optical properties of the sheeting under stress cannot be attained.

Aside from the considerations concerning the relative elastic modulus between the cube corner elements and the overlay film onto which the cube corner elements are cast, there is a requirement of relatively low elastic modulus for the overlay film. This is important if a goal of the manufacturing is to achieve a high degree of flexibility in the resulting retroreflective sheeting material. Preferably, the cube corner elements are cast onto the overlay film with a minimal amount of land. Provided that the land can be sufficiently minimized, stretching or other suitable elastic distortion of the overlay film results in the fracture of the cube corner material between the individual cube corner elements. This can be accomplished by application of elastic stress to the overlay/cube corner materials post-fabrication, or can result from the process of simply removing the materials from the fabrication apparatus. This represents considerable efficiency in fabrication in that significant post-casting operations to fracture more substantial lands to achieve the same effect are unnecessary, with resulting savings in fabrication costs.

As a consequence of the fracture of the minimal land of the cube corner film, the individual cube corner optical elements are essentially totally decoupled from each other and from the overlay material. Significant advantages derive from this decoupling. The first of these is the ultra-flexibility that is sought for the materials. The decoupled optical elements are no longer mechanically constrained by the effect of the land, regardless of the land's thickness. This permits significant distortion of the elastic overlay/cube corner composite material, while at the same time permitting essentially complete mechanical recovery of the composite material post-distortion. Also, the decoupling of the individual cube elements makes it possible to isolate any distortional stresses applied to the composite material. The direct benefit of this is that stresses applied to the retroreflective material generally have minimal degradative effect on the optical properties of the materials. With less-flexible, prior art fabrications, localized stress applied to one area of the cube corner composition can be transmitted to adjacent areas with the result that significant loss of optical properties is extended to a much greater area of the retroreflective material.

In another, dissimilar, process for achieving a certain degree of flexibility in a retroreflective article, the first step is to temporarily affix an array of cube corner elements to a sheet of base material. The cube corner elements may be formed by casting a suitable material onto a release coating on the base material. Then, a reflective layer on the cube corner elements is formed by metalizing or other means. A substrate is then affixed to the reflective layer side of the cube corner elements. The sheet of base material is removed, leaving an exposed array of relatively free standing cube corner elements formed on the substrate.

A suitable backing layer may be made of any transparent or opaque material, including colored or non-colored material, which can be sealingly engaged with the retroreflective elements. Suitable backing materials include aluminum sheeting, galvanized steel, polymeric materials such as polymethyl methacrylates, polyesters, polyamides, polyvinyl fluorides, polycarbonates, polyvinyl chlorides, and a wide variety of laminates made from these and other materials.

The backing layer or sheet may be sealed to the reflecting cube corner elements in a grid pattern or in any other suitable configuration. Sealing may be affected by used of a number of methods, including ultrasonic welding, adhesives, or by heat sealing at discrete locations on the array of reflecting elements (see, for example, U.S. Pat. No. 3,924,928). Sealing is desirable to prevent entry of contaminants such as soil or moisture and to preserve the air spaces around the cube corner reflecting surfaces. Edge sealing may be beneficial in applications such as truck conspicuity which require relatively long narrow strips of retroreflective sheeting.

If added strength or toughness is required in the composite, backing sheets of polycarbonate, polybutyrate or fiber-reinforced plastic may be used. Depending upon the degree of flexibility of the resulting retroreflective material, the material may be rolled or cut into strips or other suitable designs. The retroreflective material may also be backed with an adhesive and release sheet to render it useful for application to any substrate without the added step of applying an adhesive or using other fastening means.

While not specifically disclosed in connection with each embodiments discussed above, various modifications or combinations incorporating existing features of the cube corner retroreflective arts are contemplated by the present invention. For example, it would be obvious to one of ordinary skill in the art to provide a separation surface in the grooves which separate cube corner elements. Additionally, it would be obvious to coat a portion of the structured surface with a specularly reflective substance such as, for example, by vapor coating a layer of aluminum or silver on the surface. Further, one of ordinary skill will recognize that the dihedral angles between adjacent cube corner elements may be varied as disclosed in U.S. Pat. No. 4,775,219 to Appeldorn. Products incorporating such obvious modifications or combinations are considered to be within the scope of the present invention.

EXAMPLE I

This example illustrates the angular range of cube corner element canting which results in a desired amount of angular deviation between a plane in which the optical axes of the cube corner elements are canted and a plane of broadest entrance angularity. FIGS. 16A to 16J are isobrightness curves which illustrate the predicted retroreflective performance of a cube corner element matched pair as depicted in FIGS. 1–2. Generally, FIGS. 16A to 16E demonstrate the increasing angular displacement of the broadest planes of entrance angularity from the plane in which the cube corner elements are canted as the elements are canted through increasing cant angles up to a cant angle which results in a 65-65-50 base triangle. Thereafter, increasing the cant angle of opposing cube corner elements results in decreasing angular displacement between the broad planes of entrance angularity and the plane in which the cube corner elements are canted.

Figure 16A:
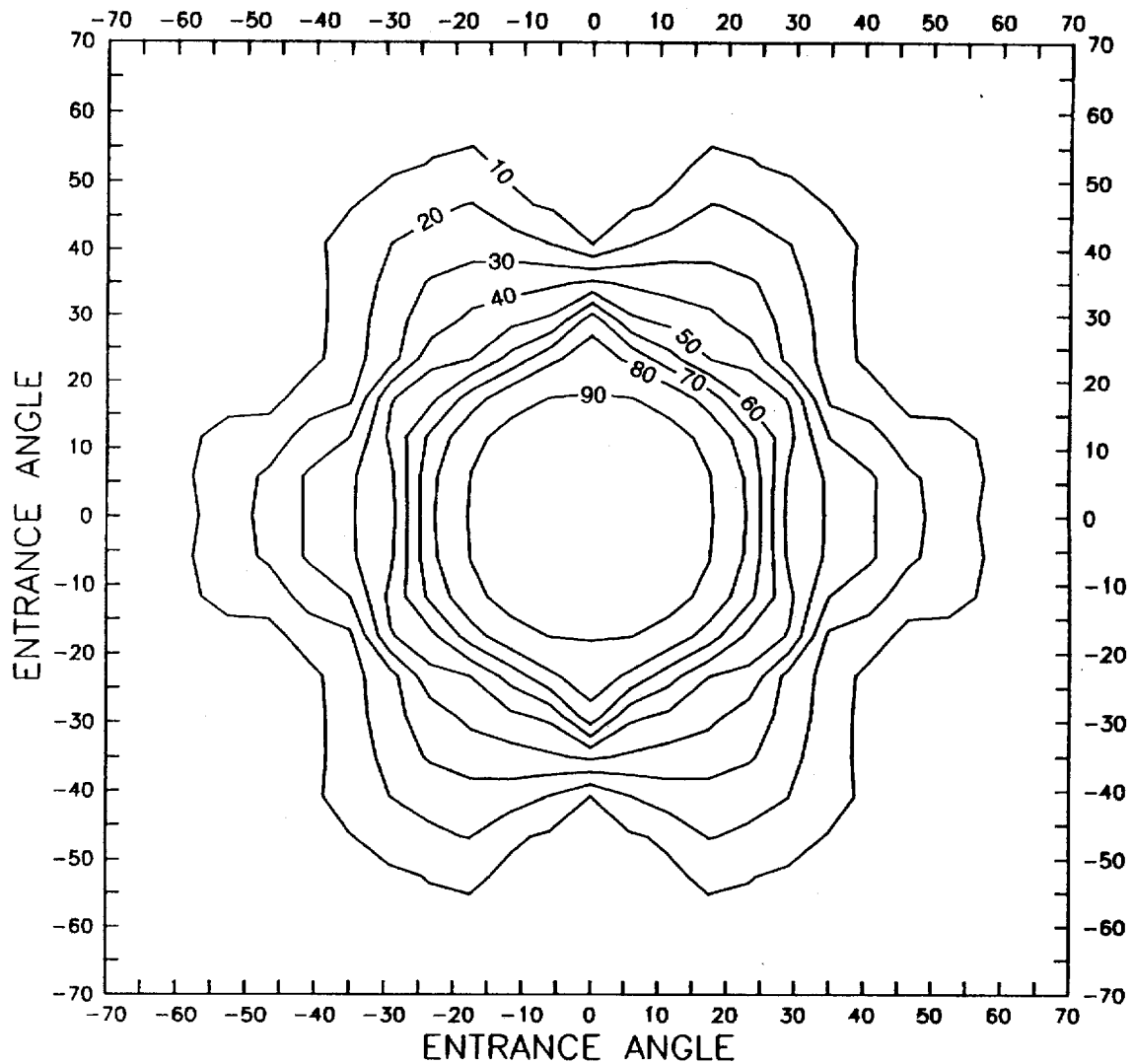
FIGS. 16a–16j are isobrightness graphs illustrating isobrightness profiles of cube corner retroreflective element matched pairs over increasing cant angles.
Figure 16B:
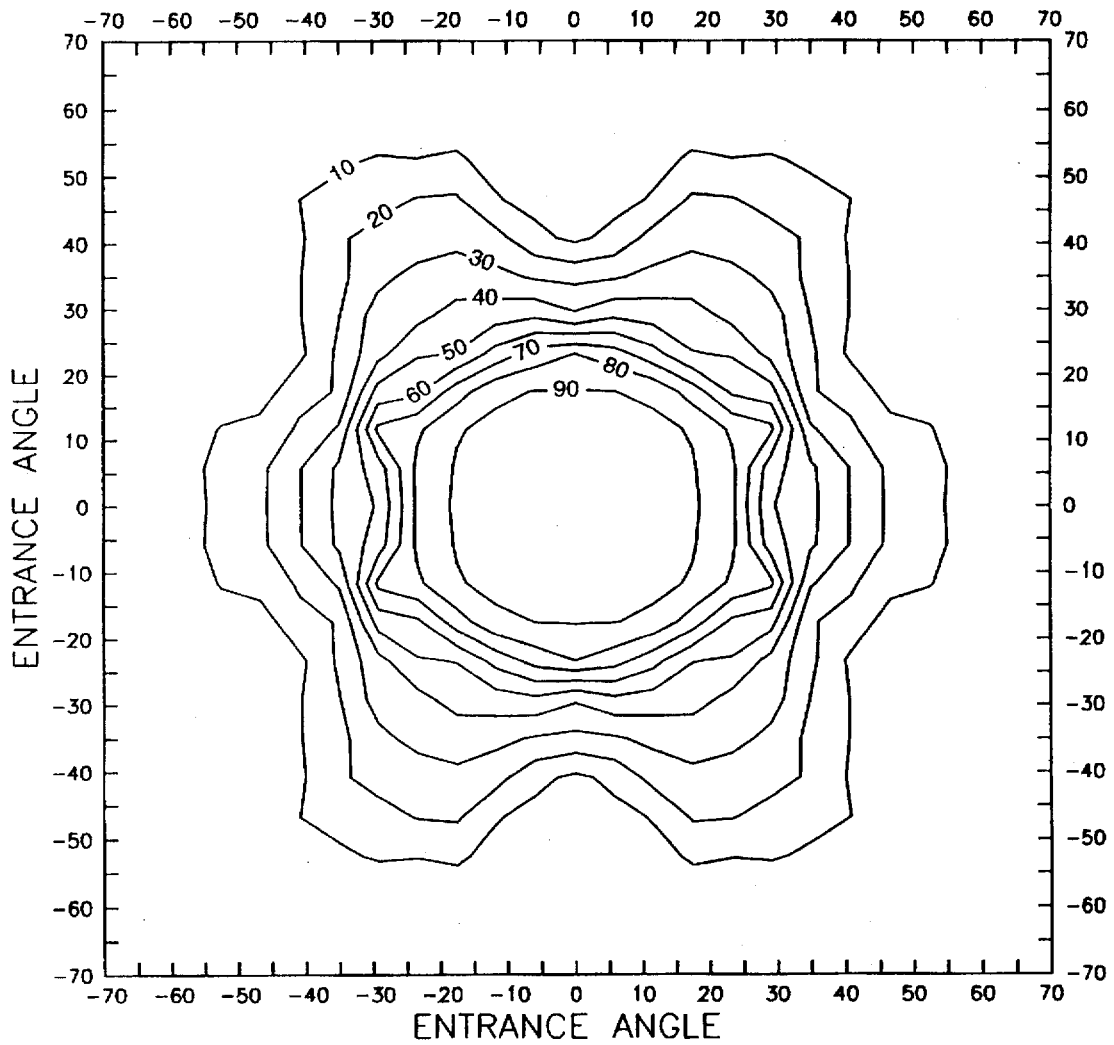
Figure 16C:
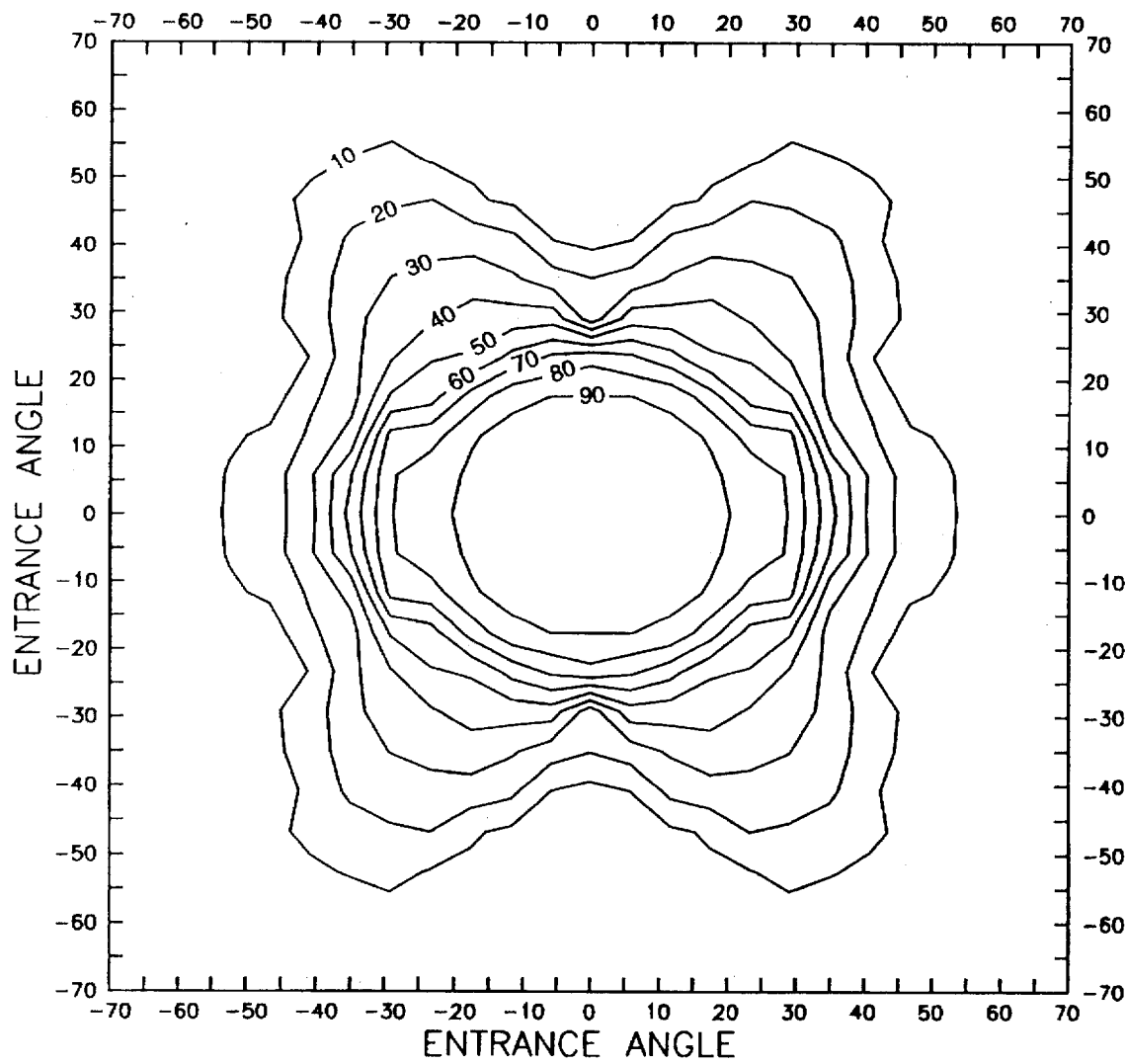
Figure 16D:
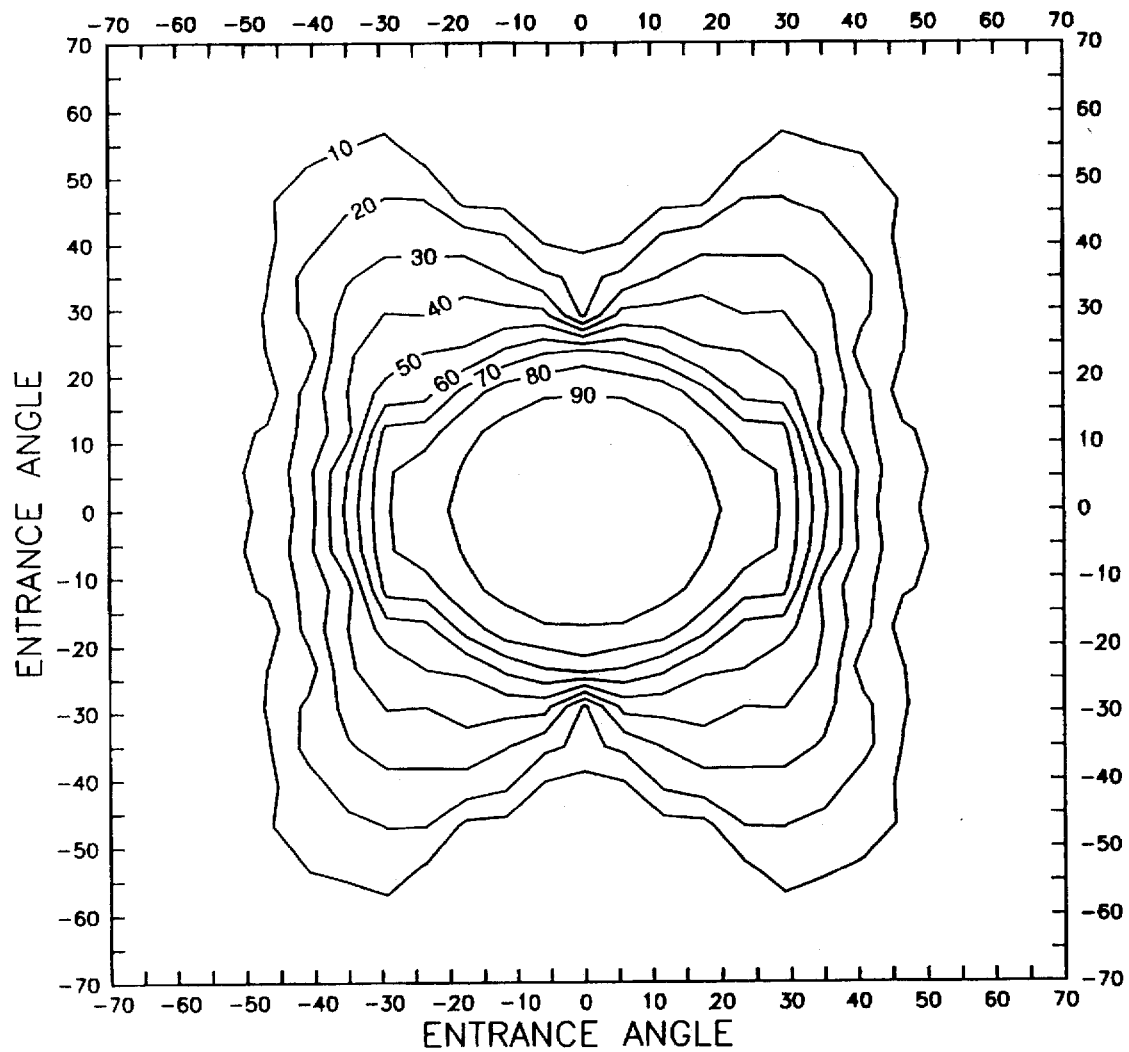
Figure 16E:
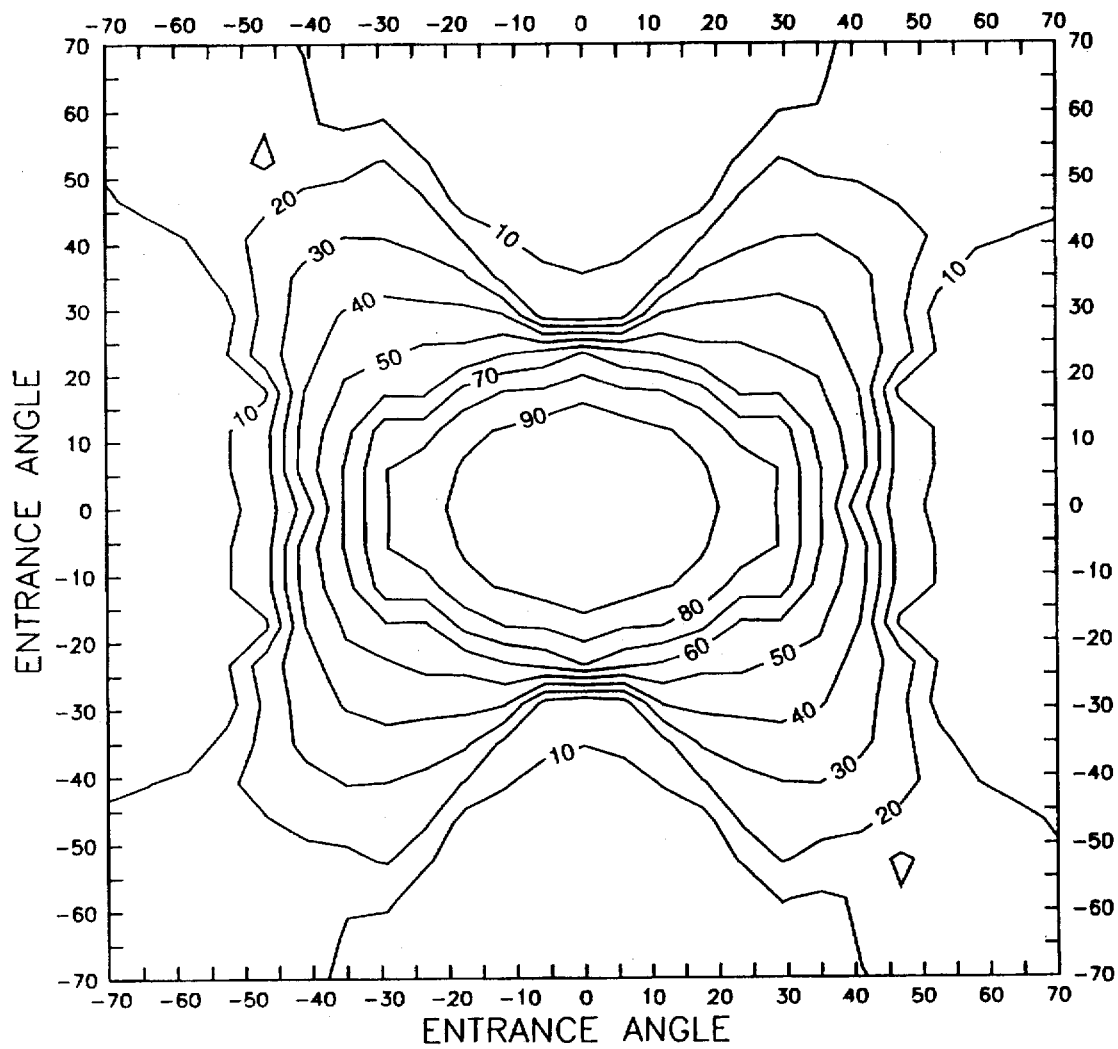
Figure 16F:
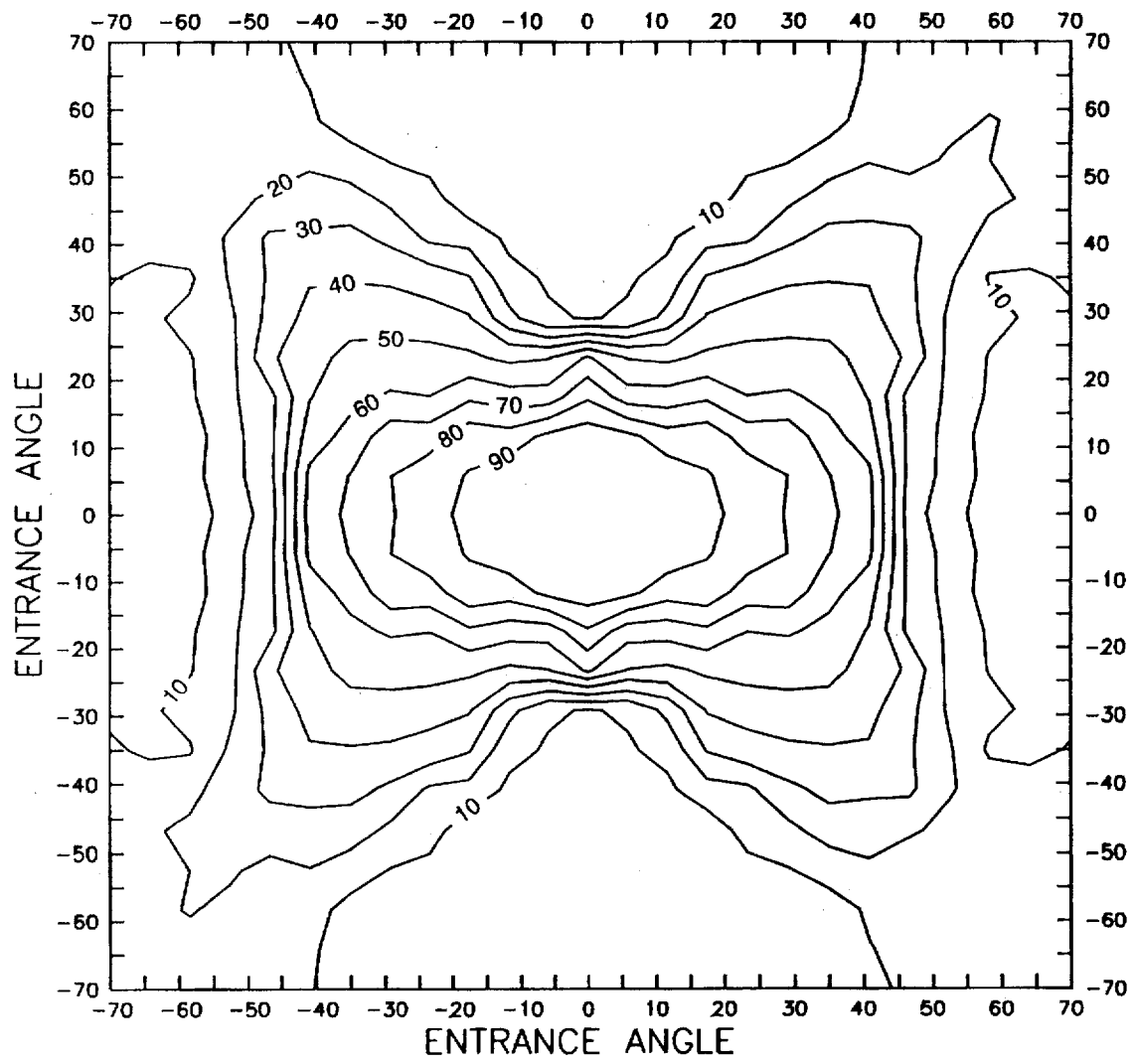

FIG. 16A is an isobrightness profile for a single cube corner element having an equilateral base triangle and a refractive index of 1.59. It exhibits the well-known six-lobe isobrightness pattern, resulting from the three axes of symmetry of the equilateral base triangle cube corner element. FIGS. 16B to 16J illustrate the distortion of the isobrightness pattern of a cube corner element matched pair as the opposing cube corner elements are canted through increasing cant angles. The opposing cube corner elements are canted in a plane which extends horizontally though the isobrightness graph. FIG. 16B represents a 1.60 degree cant, to yield an isosceles base triangle having included angles which measure approximately 61 degrees, 61 degrees, and 58 degrees. FIG. 16C represents a 3.14 degree cant, to yield an isosceles base triangle having included angles which measure approximately 62 degrees, 62 degrees, and 56 degrees. FIG. 16D represents a 4.63 degree cant, to yield an isosceles base triangle having included angles which measure approximately 63 degrees, 63 degrees, and 54 degrees. FIG. 16E represents a 7.47 degree cant, to yield an isosceles base triangle having included angles which measure approximately 65 degrees, 65 degrees, and 50 degrees. FIG. 16F represents a 10.15 degree cant, to yield an isosceles base triangle having included angles which measure approximately 67 degrees, 67 degrees, and 46 degrees.

An examination of this sequence of isobrightness graphs illustrates the increasing angular displacement of the broadest planes of entrance angularity from the plane in which the opposing cube corner elements are canted.

Figure 16G:
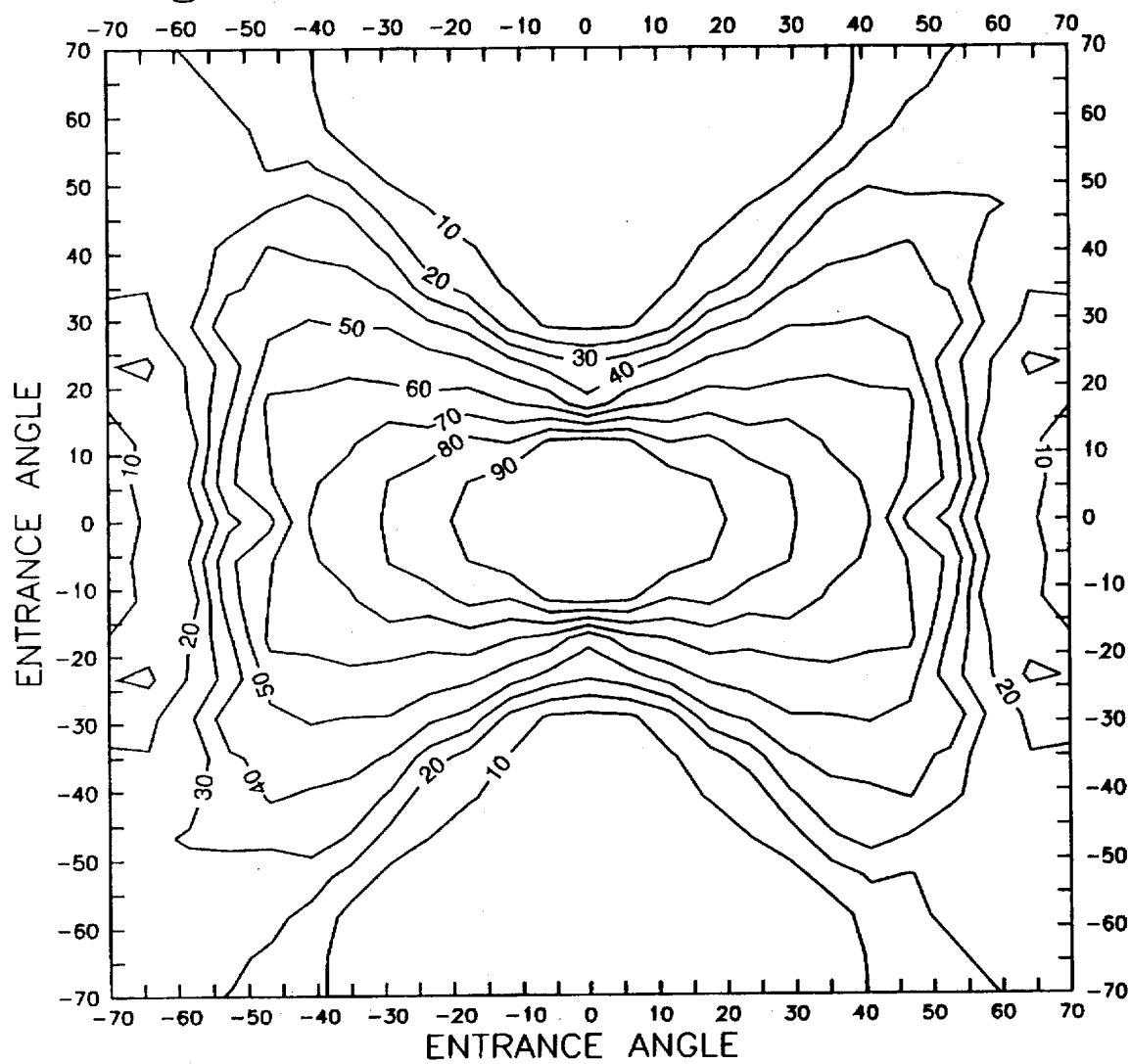
Figure 16H:
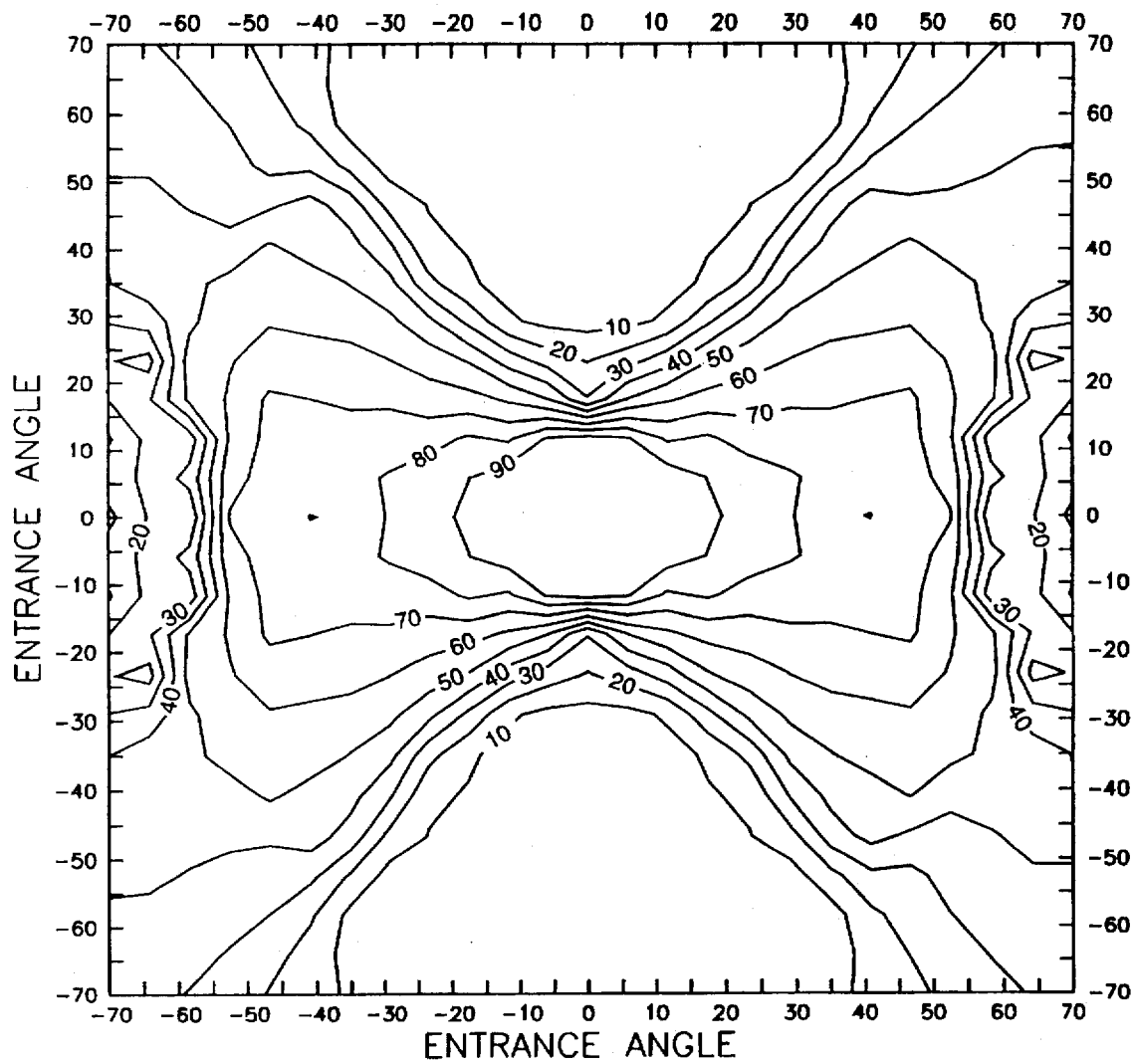
Figure 16I:
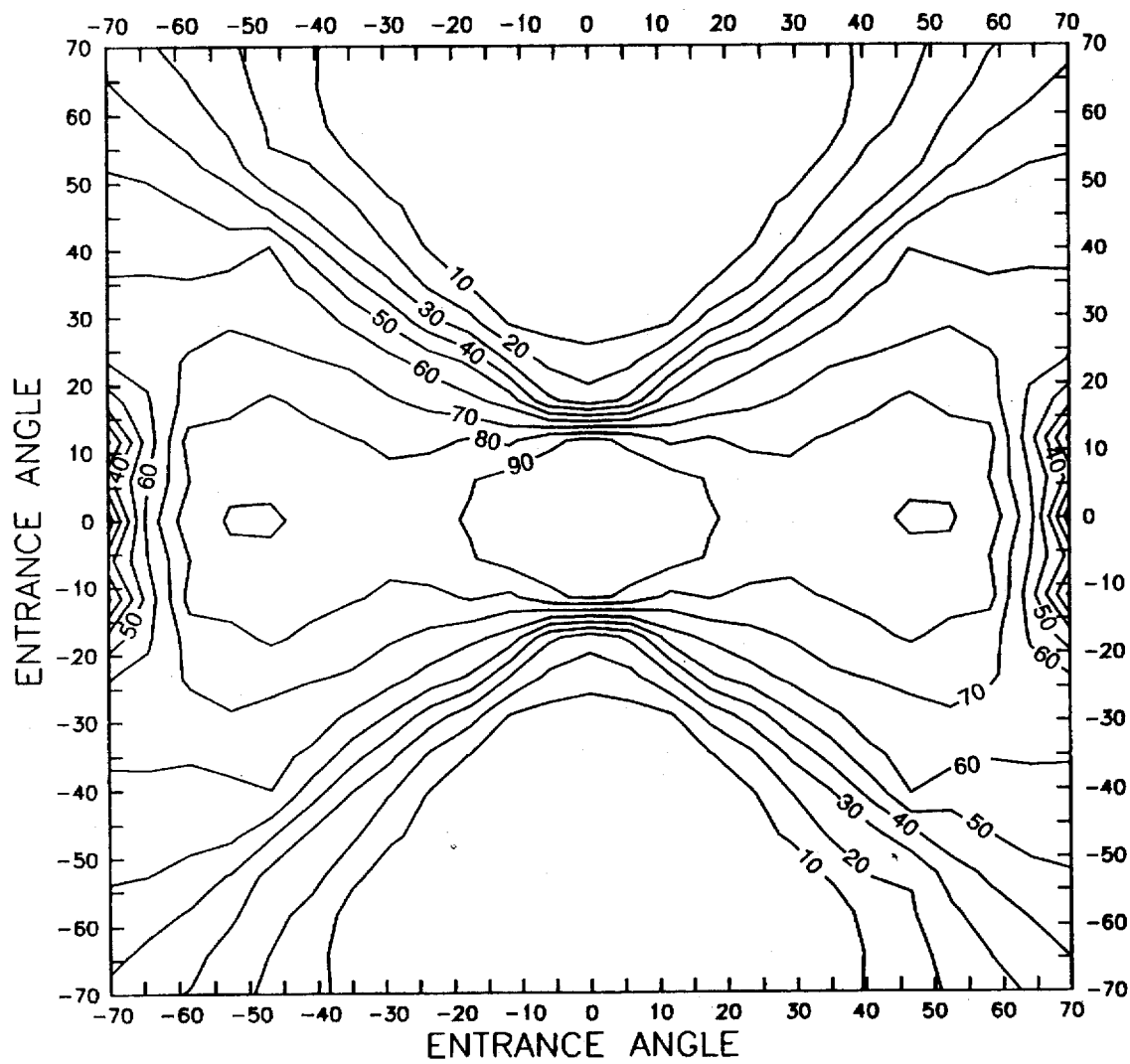
Figure 16J:
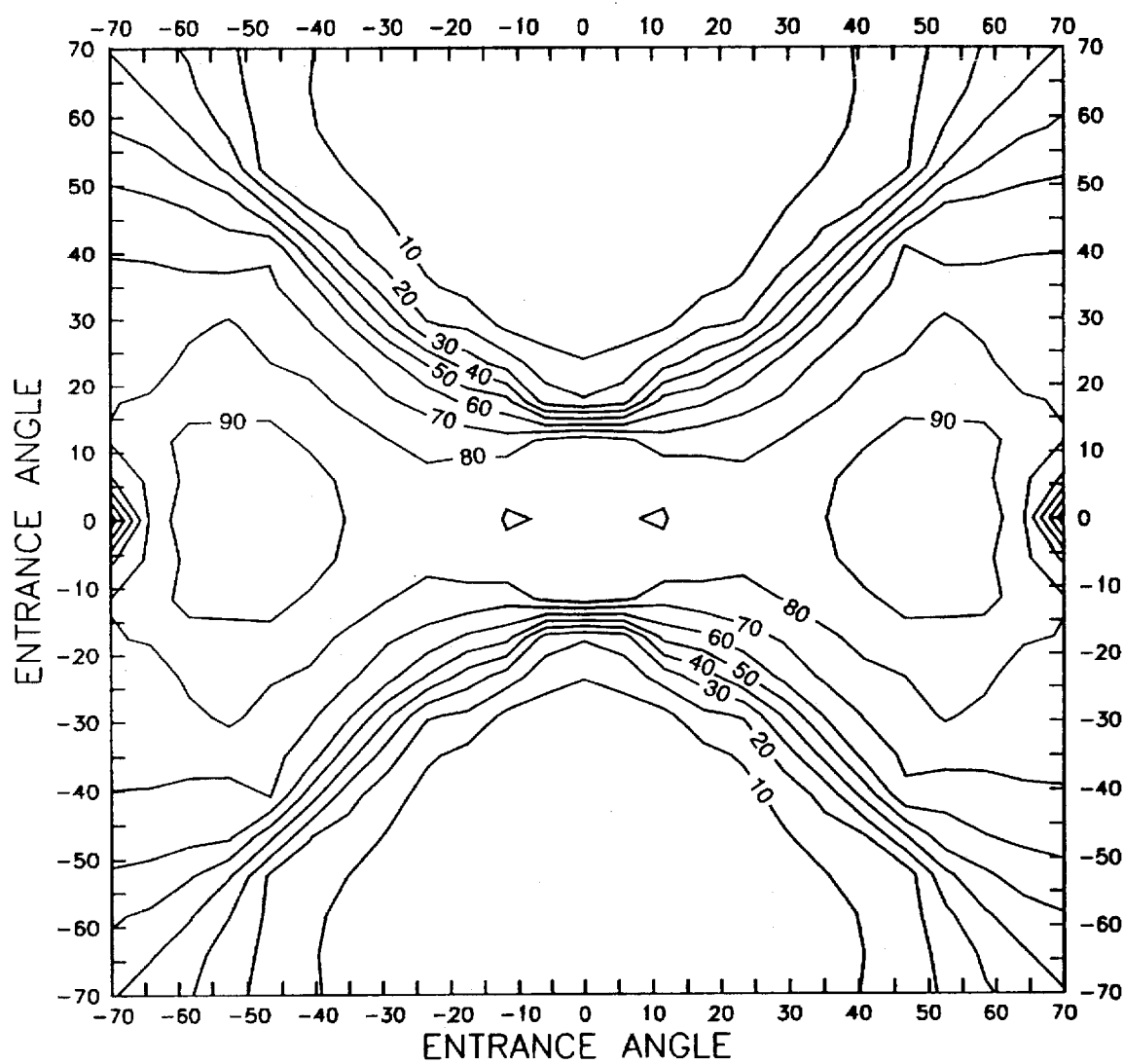

The remaining isobrightness graphs illustrate the decreasing angular divergence between the broadest plane of entrance angularity and the plane in which opposing cube corner elements are canted. FIG. 16G represents a 12.69 degree cant, to yield an isosceles base triangle having included angles which measure approximately 69 degrees, 69 degrees, and 42 degrees. FIG. 16H represents a 15.12 degree cant, to yield an isosceles base triangle having included angles which measure approximately 71 degrees, 71 degrees, and 38 degrees. FIG. 16I represents a 17.46 degree cant, to yield an isosceles base triangle having included angles which measure approximately 73 degrees, 73 degrees, and 34 degrees. FIG. 16J represents a 19.72 degree cant, to yield an isosceles base triangle having included angles which measure approximately 75 degrees, 75 degrees, and 30 degrees.

This series of isobrightness graphs demonstrates that as opposing cube corner elements are canted through increasing cant angles up to about 12 degrees, the entrance angularity of the article continues to broaden in two substantially perpendicular planes which are oriented at approximately 45 degrees relative to the plane in which the cube corner elements are canted. Further canting increases the entrance angularity in these planes and decreases the entrance angularity in a plane which is substantially coincident with the plane of cant. While the optimum amount of canting appears to be approximately 7.47 degrees, corresponding to a 65-65-50 base triangle, it will be appreciated that a range of cant angles extending from approximately 5 degrees to approximately 12 degrees appear feasible to produce a retroreflective article having two broad planes of entrance angularity oriented approximately perpendicular to one another.

Various modifications and alterations of this invention will become apparent to those skilled in the art without departing from the scope and spirit of this invention.

What is claimed is:

1. A tiled cube corner retroreflective sheeting having an edge, comprising:

a substrate having a base surface and a structured surface displaced from the base surface, the structured surface including at least two distinct arrays of cube corner elements, wherein:

(a) each cube corner array is formed by three intersecting sets of substantially parallel grooves including a primary groove set and two secondary groove sets, (b) for at least one cube corner array, the secondary groove sets intersect each other to define an included angle less than 60 degrees; and (c) a major portion of substantially every groove in the primary groove set of the at least one cube corner array is disposed in a plane that intersects the edge of the sheeting at an acute angle selected from the group of angles consisting of 5 to 25 degrees, 35 to 55 degrees, and 65 to 85 degrees.

2. A cube corner reflective sheeting according to claim 1, wherein:

a major portion of substantially every groove in the primary groove set of each cube corner array is disposed in a plane that intersects the edge of the sheeting at an acute angle selected from the group of angles consisting of 10 to 20 degrees, 40 to 50 degrees, and 70 to 80 degrees.

3. A cube corner reflective sheeting according to claim 1, wherein:

a major portion of every groove in the primary groove set of each cube corner array is disposed in a plane that intersects the edge of the sheeting at an acute angle selected from the group of angles consisting of approximately 15 degrees, 45 degrees, and 75 degrees.

4. A cube corner retroreflective sheeting according to claim 1, wherein:

for the at least one cube corner array, the secondary groove sets intersect to define an included angle between 40 and 60 degrees.

5. A cube corner retroreflective sheeting according to claim 1, wherein:

for the at least one cube corner array, the secondary groove sets intersect to define an included angle between 45 and 55 degrees.

6. A cube corner retroreflective sheeting according to claim 1, wherein: for the at least one cube corner array the secondary groove sets intersect to define an included angle of approximately 50 degrees.

7. A cube corner retroreflective sheeting according to claim 1, wherein:

a portion of the structured surface is coated with a specularly reflective material.

8. A tiled retroreflective sheeting material having an edge, comprising:

a substantially optically transparent substrate having a base surface and a structured surface opposite from the base surface, the structured surface including at least two distinct arrays of cube corner elements, wherein:
(a) each cube corner array is formed by three intersecting sets of substantially parallel grooves including a primary groove set and two secondary groove sets,
(b) for at least one cube corner array, the secondary groove sets intersect each other to define an included angle of approximately 50 degrees; and
(c) a major portion of substantially every groove in the primary groove set of the at least one cube corner array is disposed in a plane that intersects the edge of the sheeting at an angle of about 45 degrees.

9. A method of making a mold suitable for use in forming a tiled retroreflective sheeting having an edge, comprising the steps of:

(a) providing a plurality of discrete cube corner element mold sections, each cube corner element mold section comprising a substrate having a base surface disposed in a base plane and a structured surface opposite the base surface, the structured surface including an array of cube corner elements formed by three intersecting sets of parallel grooves including a primary groove set and two sets of secondary grooves, the secondary groove sets intersecting each other at an angle less than 60 degrees; and (b) assembling the plurality of discrete cube corner element mold sections into a mold suitable for use in forming the retroreflective sheeting, the mold comprising at least two distinct arrays of cube corner elements, wherein the step of assembling the cube corner element mold sections comprises the step of orienting a first mold section having a first cube corner element array such that a major portion of substantially every groove in the primary groove set of the first cube corner element array is disposed in a plane that intersects the edge of the sheeting at an acute angle selected from the group of angles consisting of 5 to 25 degrees, 35 to 55 degrees, and 65 to 85 degrees.

10. The method of claim 9, wherein the step of orienting the first mold section comprises orienting the first mold section such that a major portion of substantially every groove in the primary groove set of the first cube corner element array is disposed in a plane that intersects the edge of the sheeting at an acute angle selected from the group of angles consisting of 10 to 20 degrees, 40 to 50 degrees, and 70 to 80 degrees.

11. The method of claim 9, wherein the step of orienting the first mold section comprises orienting the first mold section such that a major portion of substantially every groove in the primary groove set of the first cube corner element array is disposed in a plane that intersects the edge of the sheeting at an acute angle selected from the group of angles consisting of approximately 15 degrees, 45 degrees, and 75 degrees.

* * * * *